US008006614B2

(12) United States Patent
Yamada et al.

(10) Patent No.: US 8,006,614 B2
(45) Date of Patent: Aug. 30, 2011

(54) HORIZONTAL HOTPRESS SYSTEM

(75) Inventors: Reiji Yamada, Aichi (JP); Yasuyuki Ohdaira, Aichi (JP); Fumio Kurita, Aichi (JP); Mineo Masuda, Aichi (JP)

(73) Assignee: Taihei Machinery Works, Komaki-Shi, Aichi (JP)

( * ) Notice: Subject to any disclaimer, the term of this patent is extended or adjusted under 35 U.S.C. 154(b) by 0 days.

(21) Appl. No.: 13/000,070

(22) PCT Filed: Jul. 27, 2009

(86) PCT No.: PCT/JP2009/063331

§ 371 (c)(1), (2), (4) Date: Dec. 20, 2010

(87) PCT Pub. No.: WO2010/018745

PCT Pub. Date: Feb. 18, 2010

(65) Prior Publication Data

US 2011/0139019 A1 Jun. 16, 2011

(30) Foreign Application Priority Data

Aug. 12, 2008 (JP) ................................ 2008-207950

(51) Int. Cl.
*B30B 15/34* (2006.01)
*B32B 37/00* (2006.01)

(52) U.S. Cl. .......... 100/194; 100/50; 100/324; 156/358; 156/367; 156/580; 156/583.1

(58) Field of Classification Search .................... 100/43, 100/48, 324, 325, 193, 194, 195, 196, 269.01, 100/46, 315, 258 A, 258 R; 156/580, 583.1, 156/583.91, 360, 358, 367, 368, 581; 700/301
See application file for complete search history.

(56) References Cited

U.S. PATENT DOCUMENTS 4,846,925 A * 7/1989 Ishida et al. .............. 156/583.1
(Continued)

FOREIGN PATENT DOCUMENTS

JP 61102201 A 5/1986
(Continued)

OTHER PUBLICATIONS

International Search Report dated Oct. 27, 2009 with an English Translation.

(Continued)

*Primary Examiner* — Jimmy T Nguyen
(74) *Attorney, Agent, or Firm* — Thomas, Kayden, Horstemeyer & Risley, LLP

(57) ABSTRACT

Two press cylinders are disposed at an equal interval at left and right having the opening-closing cylinder therebetween, so as to have the approximately same distance from the conveying reference plane as the opening-closing cylinder. The opening-closing cylinder comprises an opening-closing linear encoder, which detects a decreased amount of the entire thickness of the object-to-be-processed as a displacement of the ram, when the object-to-be-processed is hot-pressed. The respective press cylinders comprise pressure sensors for press cylinders detecting pressing pressures of the pressing plates as cylinder inner pressures. A horizontal hotpress system is provided, which can easily improve yield ratio of the boards after hot-pressing by measuring thickness size of the object-to-be-processed while hot-pressed, according to an operation distance of the opening-closing cylinder, comprising an opening-closing cylinder for opening and closing the press plates, other than a plurality of the press cylinders for pressing the press plates.

7 Claims, 21 Drawing Sheets

U.S. PATENT DOCUMENTS

| | | | | |
|---|---|---|---|---|
| 4,863,552 | A * | 9/1989 | Ishida et al. | 156/583.1 |
| 2004/0114095 | A1 * | 6/2004 | Lee et al. | 349/187 |

FOREIGN PATENT DOCUMENTS

| | | | |
|---|---|---|---|
| JP | 3-39444 | | 6/1991 |
| JP | 339444 | B2 | 6/1991 |
| JP | 3-74163 | | 11/1991 |
| JP | 374163 | B2 | 11/1991 |
| JP | 3-77761 | | 12/1991 |
| JP | 377761 | B2 | 12/1991 |
| JP | 4-40120 | | 7/1992 |
| JP | 440120 | B2 | 7/1992 |
| JP | 2007313864 | A | 12/2007 |

OTHER PUBLICATIONS

English translation of abstract of JP 3-39444, Jun. 13, 1991.

English translation of abstract of JP 3-77761, Dec. 11, 1991.

* cited by examiner

HORIZONTAL HOTPRESS SYSTEM

CROSS REFERENCE TO RELATED APPLICATION

This application is the 35 U.S.C. §371 national stage of PCT application PCT/JP2009/063331, filed Jul. 27, 2009, with Japanese Patent Office claiming priority to Japanese Patent Application 2008-207950 filed on Aug. 12, 2008, herein incorporated by reference in its entirety.

BACKGROUND OF THE INVENTION

1. Field of the Invention

This invention relates to a horizontal hotpress system for hot-pressing boards.

2. Description of the Related Art

Regarding a horizontal hotpress system (hotpress) for hot-pressing boards (boards-to-be-processed) such as plywood, decorative sheets and veneers, so as to form them to have a predetermined thickness, the horizontal system is known, which sends a plurality of boards in a standing state between a plurality of hot plates disposed, and hot-presses them by driving at least one of press plates disposed at the both outer sides. This horizontal system (horizontal hotpress) has an advantage of less likely causing unevenness by forming (unevenness of thickness) influenced by the weight of the boards or hot plates themselves, compared to the vertical method (vertical hotpress) which vertically and alternately piles up boards and hot plates held horizontally to be hot-pressed.

Further, this horizontal hotpress generally sends the boards to a press system, having one long side (lower side) of the rectangular boards as a conveying reference plane, and orients the pressing positions of two press cylinders (hydraulic cylinders) disposed in a long side direction of the rectangular boards (horizontally) to a center position of a short side (vertically) of the boards, so as to be hot-pressed. In this regard, the pressing process is conducted, based on supposition (assumption) that "by pressing an object-to-be-processed of boards and hot plates stacked in layers with a predetermined driven pressure, the entire thickness of the object-to-be-processed (consequently, thicknesses of the respective laminated boards which are hot-pressed boards) after hot-pressing can be finished within an allowable size range (setting range) according to the driven pressure". (Referred to Patent Document 1).

RELATED ART DOCUMENT

[Patent Document 1] Japanese Laid-Open Patent Publication No. 2007-313864

However, the boards have different characteristics depending on its material (wood material). For example, regarding tree species being hard and having relatively high elasticity and repulsive force (hard board) such as zelkova, lauan or the like, the laminated boards after hot-pressing can become easily thicker than specified (can easily exceed the upper limit of the setting range), due to bounce phenomenon (spring-back) by repulsion. On the other hand, regarding tree species being soft and having relatively low elasticity and repulsive force (soft board) such as cedar, paulownia or the like, its thickness can be easily decreased by pressing, and the laminated boards after hot-pressing can become easily thinner than specified (can easily go below the lower limit of the setting range). Also, even with the same tree species, sometimes they have different characteristics according to the tree's growing environment (production area) or the boards' region (e.g. the knar region is hard).

Therefore, according to the Patent Document 1, it cannot deal with these differences by the board materials (tree species, production areas, regions or the like) only by pressing the object-to-be-pressed with a specified driven pressure, and thus there are possibilities that the thickness of the laminated boards after hot-pressing can be out of specification. They become irregular products, can easily degrade the product (boards) yield ratio, and increase the board production costs. Of course, this irregular product occurrence can be suppressed to some extent by setting a target value (standard value) and a target range (allowable range) of the driven pressure according to the board material in details. However, in order to conduct such setting, not only a great deal of knowledge of the raw woods (tree species and production areas) and a great deal of proficiency of the pressing operation are required, but also change of the hot-press or the control method could be required according to soft boards or hard boards.

SUMMARY OF THE INVENTION

Problems to be Solved by the Invention

The problem of this invention is to provide a horizontal hotpress system which comprises an opening-closing cylinder for opening and closing the press plates other than a plurality of the press cylinders for pressing the press plates, so as to easily improve yield ratio of the boards (laminated boards) after hot-pressing by measuring thickness size of the object-to-be-processed while hot-pressed, according to an operation distance of the opening-closing cylinder. Alternatively, it is to provide a horizontal hotpress system which can maintain thickness of the boards (laminated boards) after hot-pressing within the allowable size range, for example, regardless of the board material to be sent in, by controlling drive of a plurality of the pressing cylinders according to an operation distance of the opening-closing cylinder and driven pressures of the press cylinders.

Means of Solving the Problems and Advantageous Effects of the Invention

In order to solve the above problems, a horizontal hotpress system of this invention manufactures a plurality of wooden laminated boards all at once, by constructing an object-to-be-processed by sending stacked boards of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

- a opening-closing cylinder disposed at a center region on pressing surfaces of the press plates, and opening and closing by moving the press plates closer and distanced;
- a plurality of press cylinders disposed at a plurality of positions different from each other to the pressing surfaces of the press plates in order to surround the opening-closing cylinder, and pressing the object-to-be-processed from a superposition direction respectively by driving the press plates; and
- a distance detecting means of detecting an operation distance of the opening-closing cylinder in the superposition direction while a plurality of the press cylinders press the object-to-be-processed, wherein thickness size at a center region of the entire object-to-be-processed while hot-pressed can be measured, according to the operation distance of the opening-closing cylinder detected by the distance detecting means.

The horizontal hotpress system comprises not only a plurality of the press cylinders (e.g. four hydraulic cylinders (fluid pressure cylinders)) for pressing the press plates, but also the opening-closing cylinder (e.g. one hydraulic cylinder (fluid pressure cylinder)) for opening and closing the press plates. Also, the yield ratio of the boards (laminated boards) after hot-pressing can be easily improved by measuring thickness size of the object-to-be-processed while hot-pressed, according to an operation distance of the opening-closing cylinder.

Further, it comprises;

a pressure detecting means of detecting at least one of driven pressures applied to a plurality of the press cylinders respectively, and a cylinder controller of controlling drive of a plurality of the press cylinders in order to have entire thickness of the object-to-be-processed after hot-pressing within a allowable size range, according to a detected value of the operation distance by the distance detecting means and a detected value of the drive pressure by the pressure detecting means.

In this way, drive of a plurality of the press cylinders are controlled (jointly or individually) according to the operation distance of the opening-closing cylinder (e.g. a ram displacement of the opening-closing cylinder) and the driven pressures of the press cylinders (e.g. inner pressures of the press cylinders), and thus thickness of the boards (laminated boards) after hot-pressed can remain within the allowable size range, for example, regardless of the board material to be sent in. In this regard, drive of the respective press cylinders can be immediately controlled (jointly or individually) according to the detected values (operation distance and driven pressures) obtained from the opening-closing cylinder and the press cylinders, and thus the control can be simplified and accelerated. Also, as a pressure detecting means which detects driven pressures applied to the press cylinders, for example, a pressure sensor, which detects inner pressures of the press cylinders, can be used. Also, as a distance detecting means which detects an operation distance of the opening-closing cylinder, for example, a linear encoder, which detects a ram displacement of the opening-closing cylinder, can be used. Further, the above pressure detecting means can be provided to only any one of the press cylinders, and drive of the respective press cylinders can be controlled jointly. Whereas, when a plurality of the opening-closing cylinders are disposed, the above distance detecting means can be provided to any one of the opening-closing cylinders.

Further, the hotpress or control method does not have to be changed according to the board material (e.g. hard boards or soft boards), thus proficiency of the hot-pressing operation is not required and the control can be simplified and accelerated. Also, Not thickness of each board (laminated boards) after hot-pressing, but entire thickness of the object-to-be-processed (the boards and the hot plates) is detected as the operation distance of the opening-closing cylinder, and then time consumed for the detection can be reduced. Accordingly, it can be prevented to have thickness of the boards (laminated boards) after hot-pressing out of the specification (e.g. too thin), due to delay of control (e.g. delay of arrest of the press cylinders).

Moreover, when a opening-closing cylinder exclusively for opening and closing the press plates is provided other than the press cylinders, and thus the opening-closing cylinder, which requires high speed shifting in a long span, and the press cylinders, which requires fine shifting in a short span, can be used selectively. Therefore, acceleration of opening-closing movement of the press plates improves operation efficiency of the hot-press, and also drive control of the press cylinders can be conducted highly accurately without influence of opening-closing movement of the press plates.

Also, a plurality of the press cylinders may be fixed styled having fixed pressing positions, mobile styled being able to shift (elevate) a pressing position to a direction intersecting (orthogonal) the sending direction of the boards (e.g. vertically), or combined styled of combining the both. In this regard, when a plurality of the cylinders are fixed styled partially or entirely, the pressing position control-to-shift features of the pressing cylinders can be simplified.

When a plurality of the press cylinders press the object-to-be-pressed, under a condition of having the driven pressures detected by the pressure detecting means within a predetermined target range, drive of a plurality of the press cylinders can be controlled so as to have the operation distance detected by the distance detecting means within a predetermined setting range.

The consistent hot-pressing process can be conducted regardless of the board material being sent in, and thus the thickness of the boards (laminated boards) after hot-pressed can be easily remain within the allowable size range. That means, the hot-pressing process or control method does not have to be changed according to the board material (e.g. hard boards or soft boards), thus proficiency of the hot-pressing operation is not required, and the control can be simplified and accelerated. Also, the opening-closing cylinder shifts further to a closing direction of the press plates (however, hardy any driven pressure occurs), while a plurality of the press cylinders press the object-to-be-processed, and at that time the distance detecting means can detect an operation distance (e.g. a ram displacement of the opening-closing cylinder).

By the way, a plurality of the press cylinders can be disposed (radially so as to surround the opening-closing cylinder as a center, and also) so as to have pressing positions to the pressing surfaces of the press plates equally distanced from the opening-closing cylinder respectively. Herewith, a plurality of the press cylinders are driven to press the press plates concurrently, and then the respective driven pressures of the press cylinders acts concurrently and equally on the press plates.

For example, a plurality of the press cylinders can be constructed an even number of fixed press cylinders having fixed pressing positions to the pressing surfaces of the press plates, and also the fixed pressing positions can be disposed to be point-symmetrical as well as line-symmetrical to each other to the opening-closing cylinder.

In this way, further simplification can be achieved, as no pressing position control-to-shift feature of the pressing cylinder needs to be provided, by having all the pressing cylinders as fixed ones. Also, when the respective pressing positions are disposed point-symmetrically as well as line-symmetrically to each other to the opening-closing cylinder, driven pressures of the relative press cylinders can act on the press plates concurrently and equally.

Specifically, when the four press cylinders are disposed to be point-symmetrical to each other to the opening-closing cylinder, the opening-closing cylinder is disposed at an intersection of a pair of straight lines intersecting on the pressing surface, whereas a plurality of the press cylinders are disposed on the respective straight lines, having the intersection therebetween, and all distanced for equal intervals to the intersection.

Also, when the above four press cylinders are disposed to be point-symmetrical as well as line-symmetrical to each other to the opening-closing cylinder, it can be described that, supposed a pair of straight lines intersecting at a fixed point by connecting two points equally distanced from the fixed point being set on the pressing surface and each point point-cymmetrical to the fixed point, the opening-closing cylinder is disposed at an intersection of a pair of the straight lines which is the fixed point being set on the pressing surface, whereas a plurality of the press cylinders are respectively disposed at each point so as to be point-symmetrical to the two points and the fixed point.

Alternatively, the boards are sent in having one long side of a rectangle shape as a conveying reference plane, and a press cylinder, disposed at least closer to the conveying reference plane than the opening-closing cylinder, of a plurality of the press cylinders can be constructed as a fixed press cylinder having a fixed pressing position.

In this way, some (e.g. two of the four) or all of a plurality of the press cylinders are fixed press cylinders, and so that the pressing position control-to-shift features of the pressing cylinders can be simplified. Further, a plurality of the press cylinders can be disposed dispersively to be aligned to a plurality of lines (e.g. two lines), having the pressing positions along the conveying reference plane. In this way, by aligning a plurality of the press cylinders to a plurality of lines along the conveying reference plane, driven pressures of the press cylinders can be set commonly for the press cylinder group aligned on the same line having the same distance from the conveying reference plane, and thus the pressing control can be achieved smoothly.

Specifically, a plurality of the press cylinders can include;

a plurality of fixed press cylinders disposed on a region closer (lower side) to the conveying reference plane than the opening-closing cylinder, and also having fixed pressing positions; and similarly a plurality of mobile press cylinders disposed on a region farther (upper side) from the conveying reference plane, and also having pressing positions shiftable (vertically) to the pressing positions of the fixed press cylinders.

In this way, the pressing position control-to-shift feature of the press cylinders can be simplified by having some of the press cylinders as fixed press cylinders (e.g. two of the four). Also, as having the press cylinders on a farther side from the conveying reference plane (e.g. the other two) being position-shiftable as mobile press cylinders, even if the board size changes and then a relative positional relation with the boards (the conveying reference plane and the opposite long side) changes, the pressing positions of the mobile press cylinders can be shifted. Further, for example, an elevator hydraulic cylinder (fluid pressure cylinder) can be used as the pressing position control-to-shift feature for the mobile press cylinders. In this way, when the board size changes, this can suppress an adjusted width of the driven pressures of the press cylinders (allowable difference of the target value) and an adjusted width of the operation distance of the opening-closing cylinder (allowable difference of the setting value) to a small width.

BEST MODES FOR CARRYING OUT THE INVENTION

Embodiment 1

Figure 1:
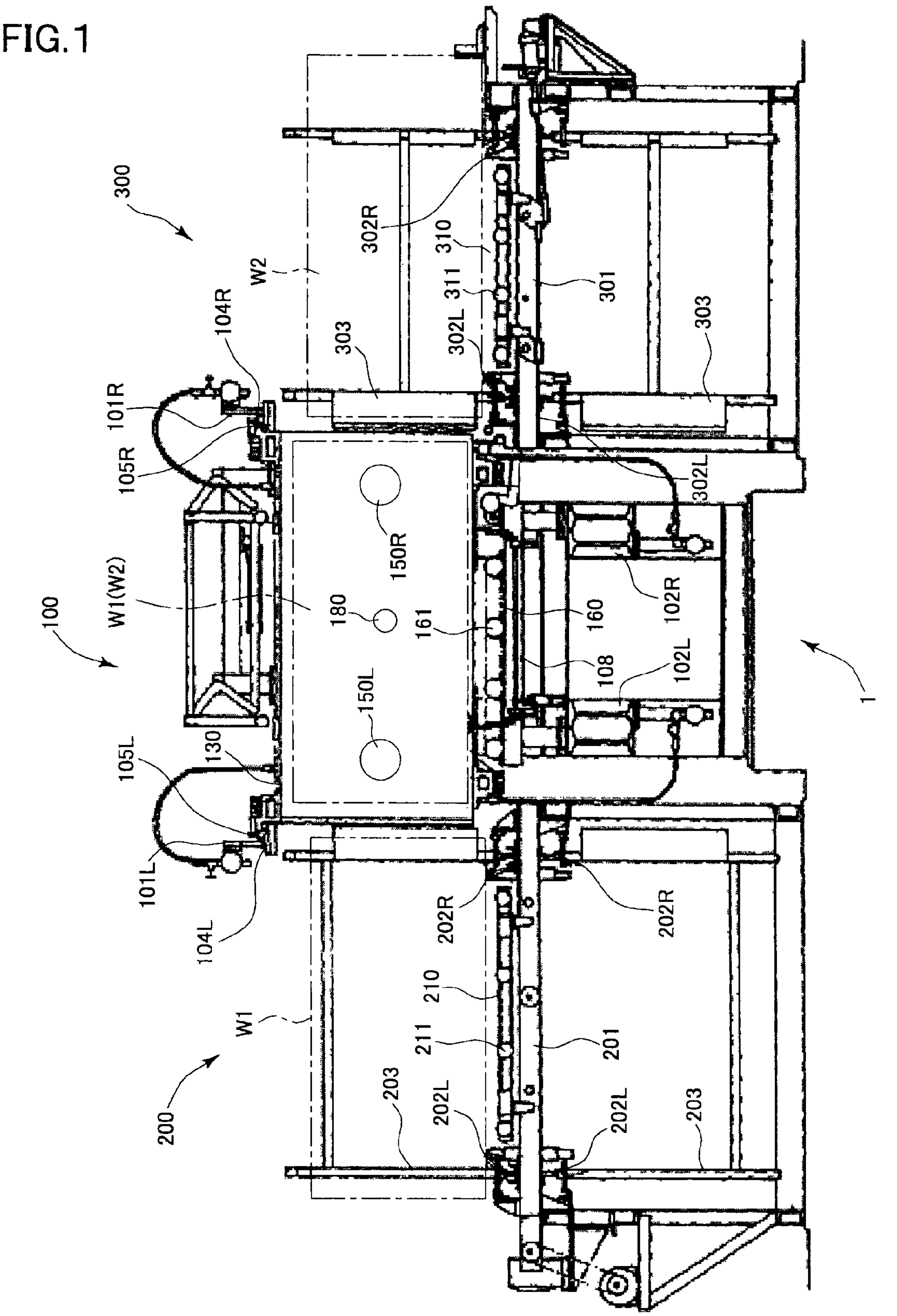
FIG. 1 is an elevation view showing an example of a horizontal hotpress system related to this invention.

Hereinafter, embodiments of this invention will be explained, referring to embodiments shown in the attached drawings. FIG. 1 is an elevation view showing an example of a horizontal hotpress system related to this invention. Regarding a horizontal hotpress system 1 shown in FIG. 1, a plurality of veneers having adhesive applied on bonding surfaces are stacked so as to be a plurality of rectangular boards-to-be-processed W1 (board) in a horizontal state, being held in a standing state at a loader 200 (carry-in entrance), and then sent to a hotpress 100 (hot pressurizer). After hot-pressed for a predetermined time at the hotpress 100, processed boards W2 (laminated boards) formed having a predetermined thickness are turned to be in a horizontal state again, and then sent out by a unloader 300 (carry-out exit).

Figure 3:
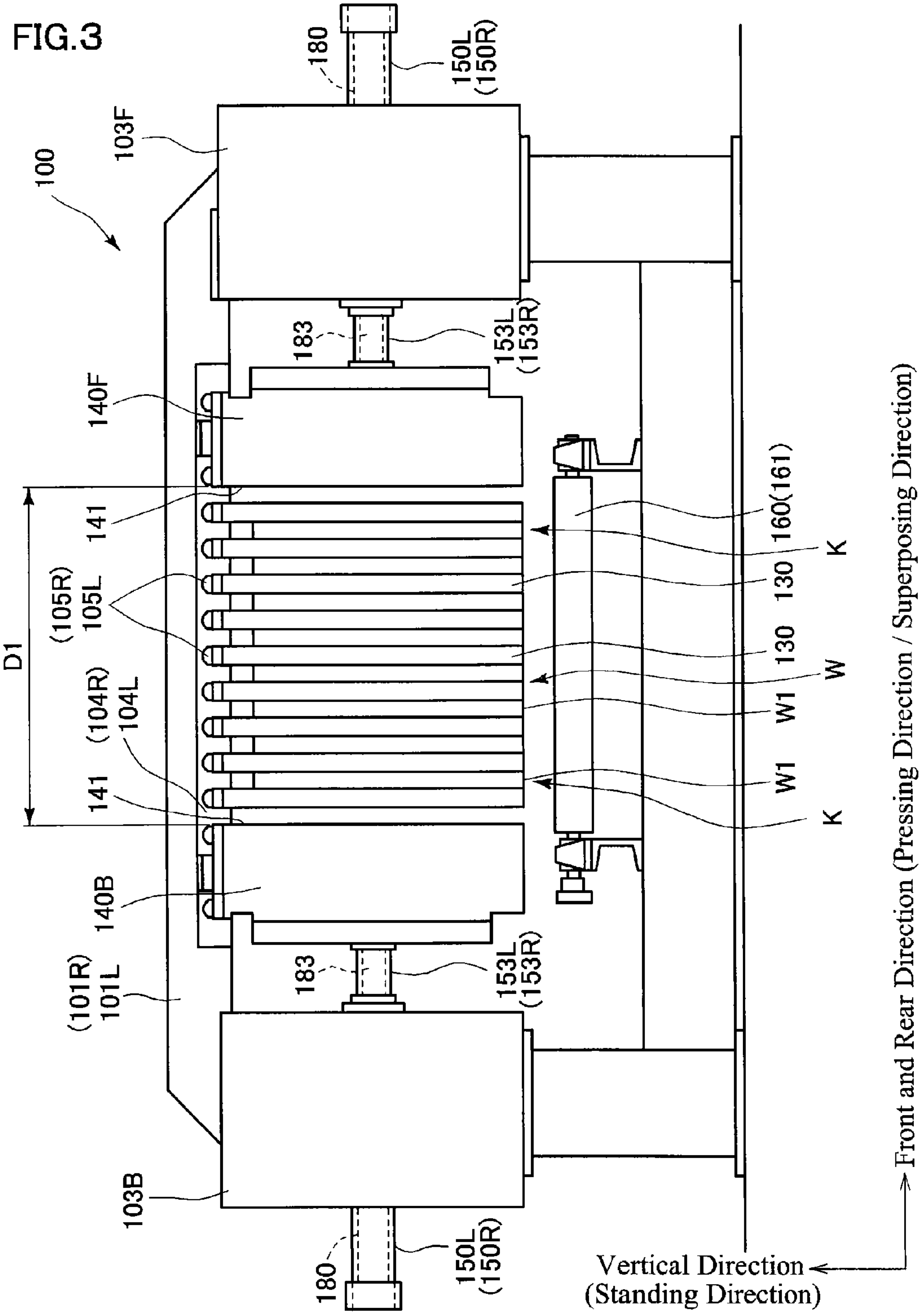
FIG. 3 is a side elevation view showing FIG. 2

The hotpress 100 comprises a pair of fixed frames 103F, 103B disposed over an upper pair and a lower pair of cross beams 101L, 101R, 102L, 102R disposed vertically (in a standing direction) and horizontally (in a sending direction; in a feeding direction) being spaced at respective predetermined intervals (referred to FIG. 3). Rails 104L, 104R are laid on the upper cross beams 101L, 101R, being attached with transfer rollers 105L, 105R (moving members). Multistage hot plates 130 and a pair or single (e.g. a pair of) press plates 140F, 140B at front and back (referred to FIG. 3) are suspended, having the transfer rollers 105L 105R interposed, between the rails 104L, 104R. On the fixed frames 103L, 103B, a plurality (e.g. two) of press cylinders 150L, 150R (hydraulic cylinders; fluid pressure cylinders) are inserted at predetermined intervals, and ends of rams 153L, 153R thereof are attached to the press plates 140F, 140B (referred to FIG. 3). Also, one of the fixed frames 103F, 103B may play as a press plate.

On the bottom of the hot plates 130, a roller conveyer 160 (conveying member) is disposed, by which the boards-to-be-processed W1 are supported in a standing state from the bottom, and sent-in from the loader 200 to the hotpress 100. In order to send in the boards-to-be-processed W1, the roller conveyer 160 comprises a plurality (e.g. four) of claw rollers 161 having a width of the longitudinal direction so as to reach an entire sending-in route K (referred to FIG. 3), and being disposed on a device frame 108 over the lower cross beams 102L, 102R. The boards-to-be-processed W1 are sent in from the loader 200 by the roller conveyer 160, turned to be processed boards W2 after being hot-pressed with the hot plates 130, and again sent out to the unloader 300 by the roller conveyer 160.

The loader 200 is disposed on the sending-in side (upstream of the sending direction (back side)) of the hotpress 100. The loader 200 is provided with a pair of chain conveyers 202L, 202R (endless members) spaced at a predetermined interval at left and right on a mounting 201. The chain conveyers 202L, 202R are provided with a loader shelf 203. A sending-in conveyer 210 (sending-in member) is disposed on the mounting 201, in order to pass the boards-to-be-processed W1 in a standing state to the roller conveyer 160 of the hotpress 100. The sending-in conveyer 210 comprises a plurality (e.g. four) of claw rollers 211 having width of the longitudinal direction so as to reach the entire boards-to-be-processed W1 (the sending-in route K, referred to FIG. 3).

The unloader 300 is disposed on the sending-out side (downstream of the sending direction (front side)) of the hotpress 100. The unloader 300 is disposed with a pair of chain conveyers 302L, 302R (endless members) spaced at an predetermined interval at left and right on a mounting 301. The chain conveyers 302L, 302R are provided with a unloaded shelf 303. A sending-out conveyer 310 (sending-out member) is disposed on the mounting 301, in order to receive the processed boards W2 in a standing state from the roller conveyer 160 of the hotpress 100. The sending-out conveyer 310 comprises a plurality (e.g. four) of claw rollers 311 having a width of the longitudinal direction so as to reach the entire processed boards W2.

Figure 2:
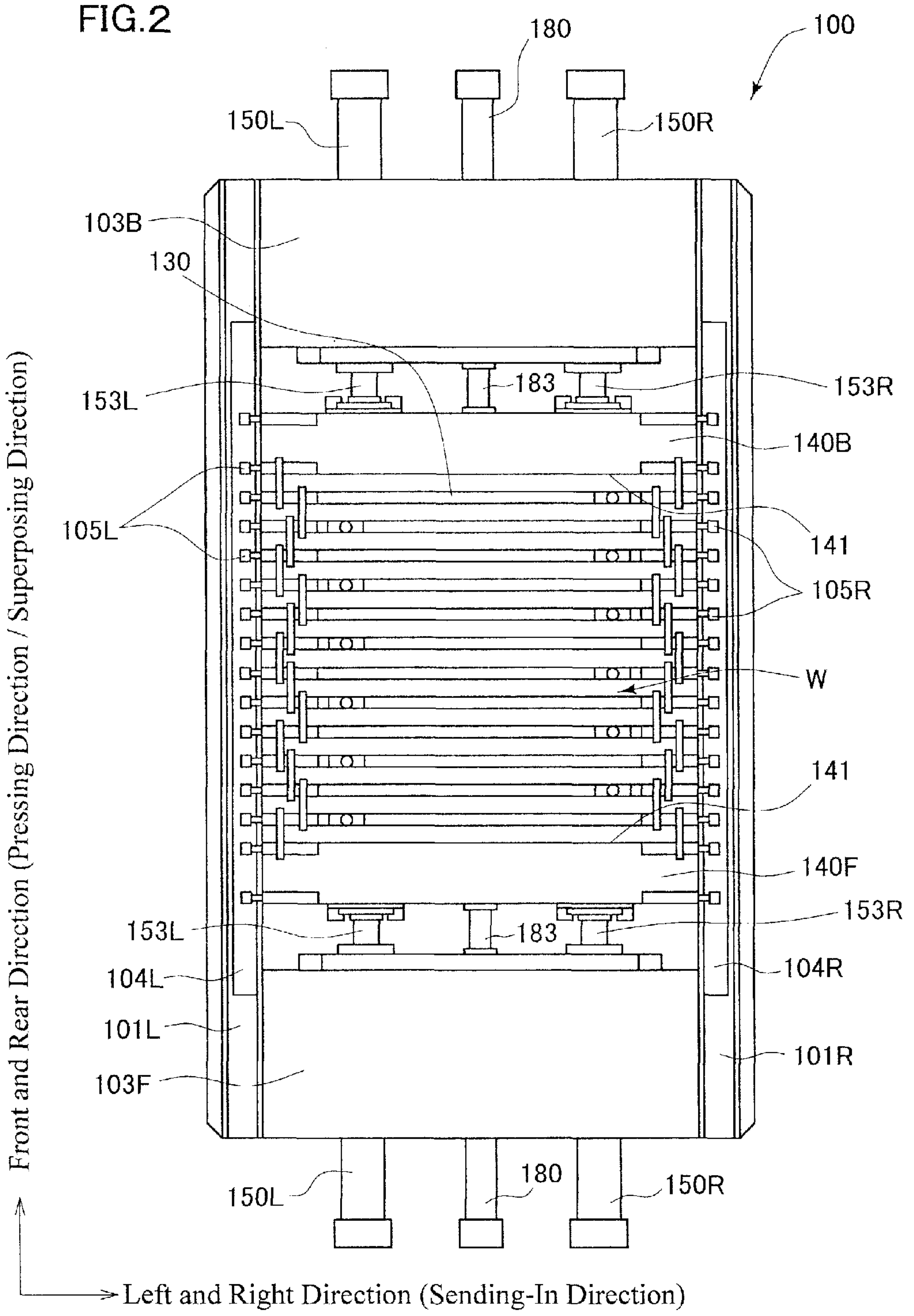
FIG. 2 is a plan view showing a closed state of the press plates.
Figure 4:
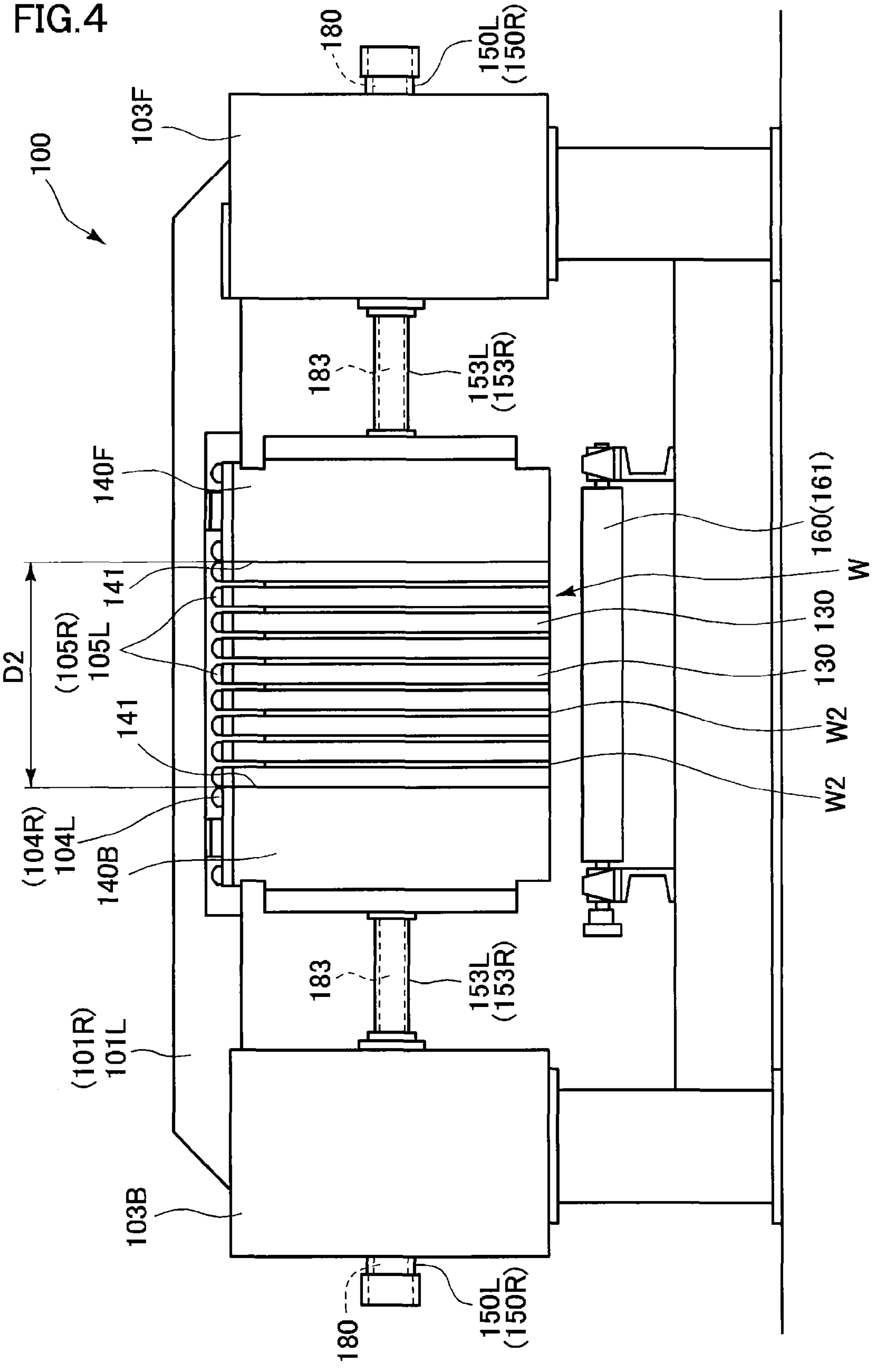
FIG. 4 is a side elevation view showing a completed state of hot-pressing.

Next, FIG. 2 is a plan view showing a closed state of the press plates, FIG. 3 is a side elevation view thereof, and FIG. 4 is a side elevation view showing a completed state of hot-pressing. The hotpress 100 (hot pressurizer; press structure) shown in FIG. 2 is provided with fixed frames 103F, 103B being fixed horizontally at front and back, and parallel upper cross beams 101L, 101R on the top area between the fixed frames 103F, 103B. Rails 104L, 104R laid on the cross beams 101L, 101R are provided with a plurality of transfer rollers 105L, 105R (moving members). The transfer roller rollers 105L, 105R move according to a rolling state of the skids and a sliding state by surface contact as known, and in words they could be any means mobile linearly in a horizontal direction.

In order to heat the boards-to-be-processed W1 standing vertically being sandwiched, when the press is closed, the respective transfer rollers 105L, 105R are connected to a top side of the hot plates 130, and a plurality of these hot plates 130 are suspended anteroposteriorly in a parallel state, so as to make up a hot plate group. Also, when the press is open, in order to insert the boards-to-be-processed W1 between the hot plates 130, the contiguous hot plates 130 are positioned parallel in a sending direction, maintaining predetermined intervals. Further, steam, hot oils or the like are filled in the hot plates 130, and the temperature is maintained according to the kind of the boards-to-be-processed W1.

Also, a pair of the press plates 140F, 140B at front and back are provided, which connect to the hot plates 130 of the hot plate group, and move the hot plates 130 back and forth, in order to conduct press-closing and press-opening. The press plates 140F, 140B are disposed, being opposed to the respective hot plates 130 positioned on both front and back sides of the hot plate group, and suspended being mobile freely to back and forth, having the transfer rollers 105L, 105R connected to a top side of the press plates 140F, 140B. Also, the press plates 140F, 140B connect to the rams 153L, 153R of the press cylinders 150L, 150R provided on the fixed frames 103L, 103B, so as to be able to travel back and forth freely by the rams 153L, 153R. Further, the press plates 140F, 140B in FIG. 2 travel back and forth to the fixed frames 103F, 103B.

In this embodiment, the rams 153L, 153R of the press cylinders 150L, 150R are fixed to the press plates 140F, 140B respectively, so as to fix pressing positions to the pressing surfaces 141 of the press plates 140F, 140B. Then, around centers (center areas) of the pressing surfaces 141, and at both outer sides of the press plates 140F, 140B, a ram 183 of an opening-closing cylinder 180 (hydraulic cylinders; fluid pressure cylinders) is disposed (fixed), which moves the press plates 140F, 140B closer to and away from each other for closing and opening (referred to FIGS. 3 and 4).

Figure 5:
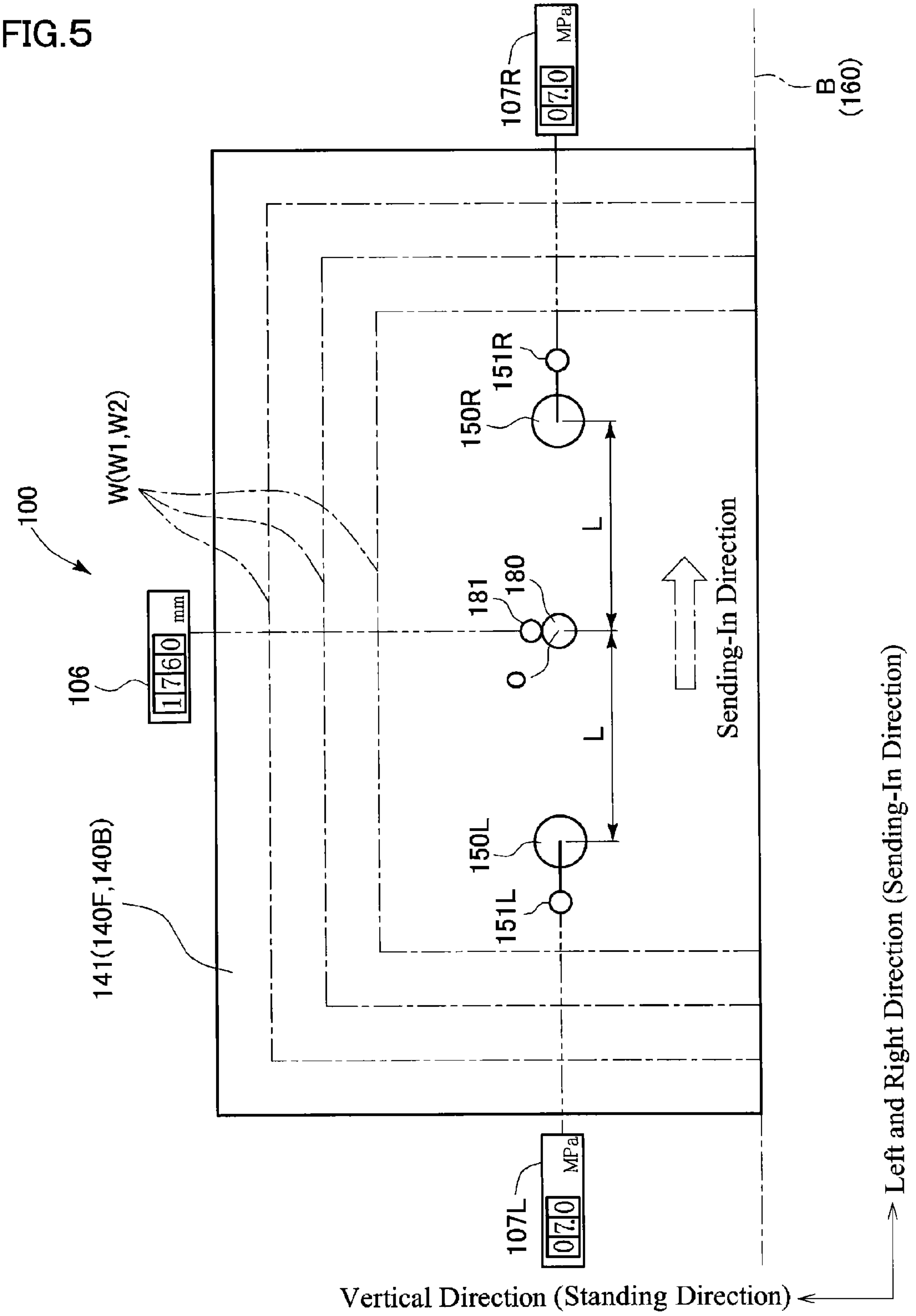
FIG. 5 is an elevation view showing an example of an alignment relation of the press control system.

Accordingly, the boards-to-be-processed W1 in a standing state are sent between the hot plates 130, having one long side (bottom side) of the rectangle as a conveying reference plane B (referred to FIG. 5). The boards-to-be-processed W1 and the hot plates 130 multi-stacked in a thickness direction configure an object-to-be-processed W. Prior to hot-pressing of the object-to-be-processed W (the boards-to-be-processed W1) by the press cylinders 150L, 150R, the opening-closing cylinder 180 closes the press plates 140F, 140B (referred to FIG. 3). The press cylinders 150L, 150R are jointly (mutually) controlled to conduct hot-pressing, in order to maintain entire thickness of the object-to-be-processed W after hot-pressing within a predetermined allowable range entirely on the pressing surfaces 141, for example, even if size or material of the board-to-be-processed W1 changes. After completing hot-pressing by the press cylinders 150L, 150R (referred to FIG. 4), the opening-closing cylinder 180 opens the press plates 140F, 140B.

Figure 6:
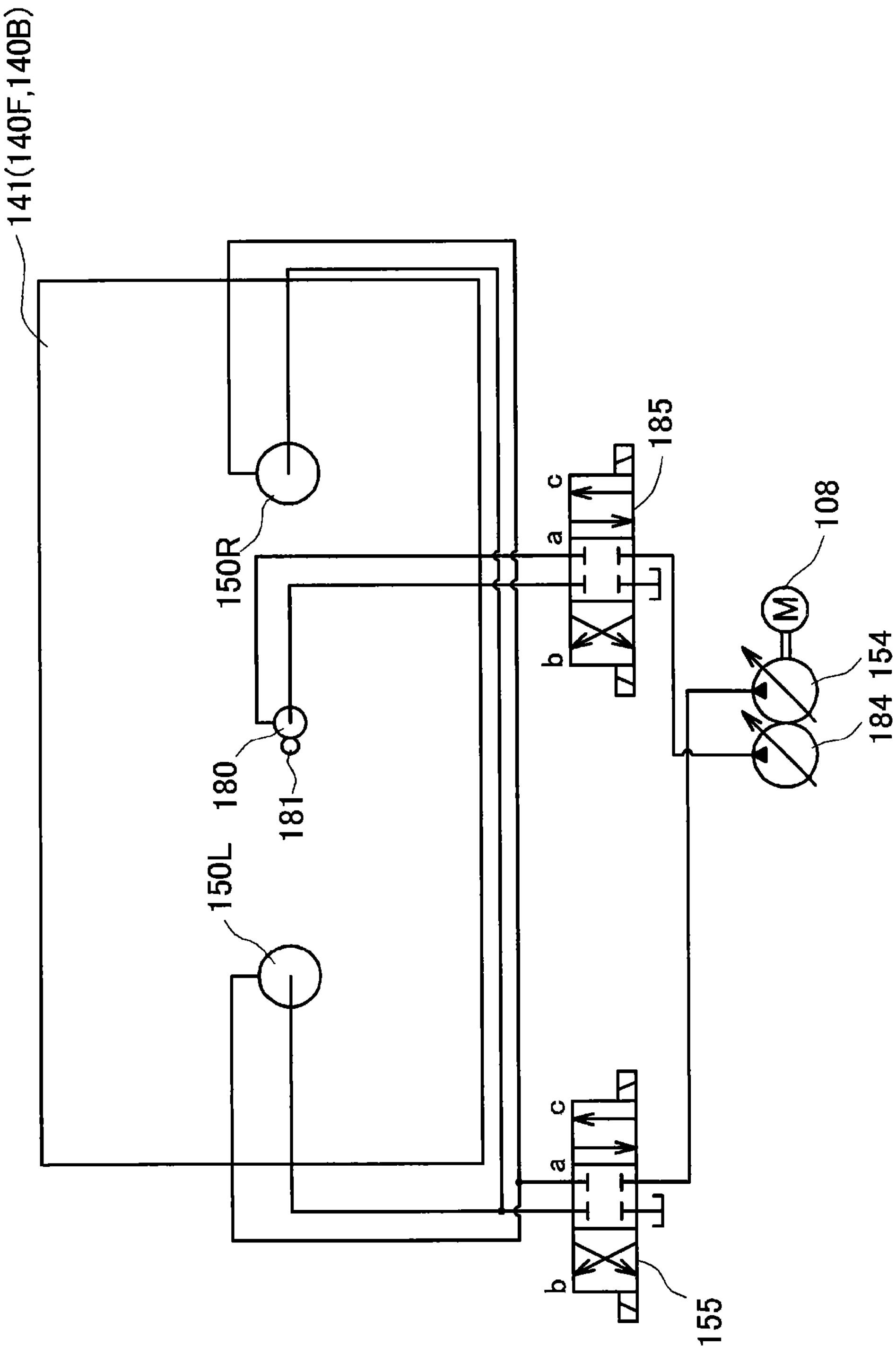
FIG. 6 is a schematic circuit diagram of the hydraulic pressure of FIG. 5.
Figure 7:
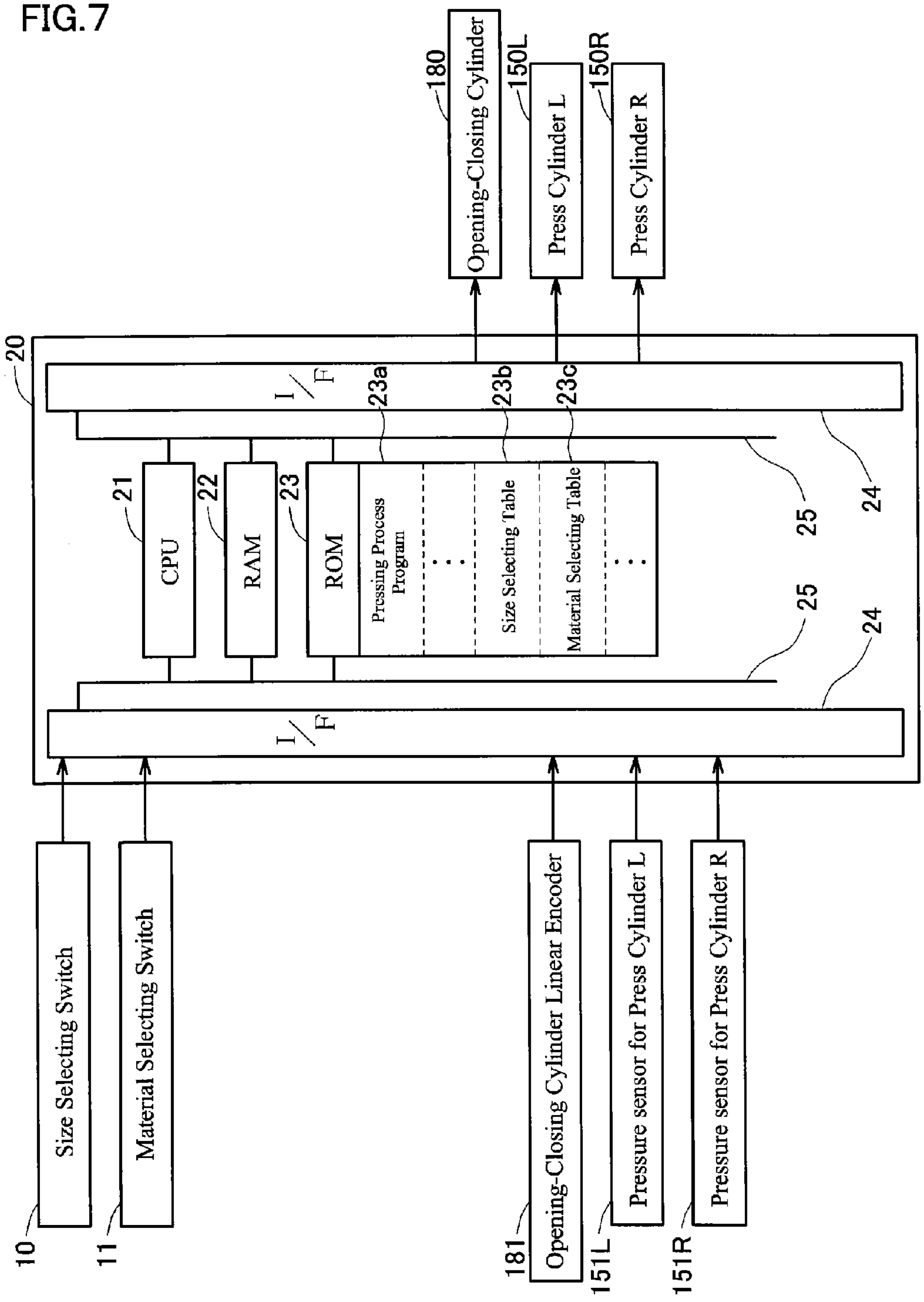
FIG. 7 is a block chart showing an electrical configuration of FIG. 5.

Next, FIGS. 5 to 7 show specific structures of the press control system of this invention. FIG. 5 is an elevation view showing an example of an alignment relation of the press control system, FIG. 6 is a schematic circuit diagram of the hydraulic pressure thereof, and FIG. 7 is a block chart showing an electrical configuration thereof.

As shown on the alignment relation view of FIG. 5, the two press cylinders 150L, 150R are disposed on left and right at equal spaces L to the opening-closing cylinder 180, while having the approximately same offset distance from the conveying reference plane B as the opening-closing cylinder 180. That means, the press cylinders 150L, 150R are disposed point-symmetrically and line-symmetrically to each other in relation to the opening-closing cylinder 180, and thus driven pressures applied to the respective press cylinders 150L, 150R (that are cylinder inner pressures) act concurrently and equally to the press plates 140F, 140B.

The opening-closing cylinder 180 comprises a opening-closing linear encoder 181 (displacement detecting means;

distance detecting means), which detects a decreased amount D1−D2 of the entire thickness of the object-to-be-processed W as a displacement (operation distance) of the ram 183, when the object-to-be-processed W is hot-pressed by the press cylinders 150L, 150R from a closed state of the press plates 140F, 140B (the size of the entire thickness size D1; referred to FIG. 3) to a completed state (the size of the entire thickness size D2; referred to FIG. 4). Whereas the respective press cylinders 150L, 150R comprise pressure sensors for press cylinders 151L, 151R (pressure detecting means) detecting pressing pressures of the press plates 140F, 140B as cylinder inner pressures (driven pressures) of the press cylinders 150L, 150R. The press cylinders 150L, 150R are fixed to the press plates 140F, 140B respectively, so as to have fixed pressing positions to the pressing surfaces 141 of the press plates 140F, 140B. Also, a ram displacement display 106 and cylinder inner pressure displays 107L, 107R are provided to display detected values of the linear encoders 181 and the pressure sensors 151L, 151R through a transmitter (sending device) or the like.

As shown on a schematic circuit diagram of the hydraulic pressure of FIG. 6, an electromagnetic switching valve 155, which is a 4-port and 3-position switching type, is disposed between a press cylinder hydraulic pressure pump 154, which is a variable capacity type driven by an electrical motor 108, and the respective press cylinders 150L, 150R (hydraulic cylinders; fluid pressure cylinders). The electromagnetic switching valve 155 connects the hydraulic pump 154 and the press cylinders 150L, 150R concurrently to a closing direction of the press plates 140F, 140B when switched from the neutral position a to the position b, and connects to a opening direction of the press plates 140F, 140B when switched to the position c. Also, in order to control drive of the press cylinders 150L, 150R highly accurately, it is desirable to apply PWM control based on duty ratio (so called duty control) or the like to the electromagnetic switching valve 155.

An electromagnetic switching valve 185, which is a 4-port and 3-position switching type, is disposed between a opening-closing cylinder hydraulic pressure pump 184, which is a variable capacity driven by the electrical motor 108, and the opening-closing cylinder 180. The electromagnetic switching valve 185 connects the hydraulic pump 184 and the opening-closing cylinder 180 to a closing direction of the press plates 140F, 140B when switched from the neutral position a to the position b, and connects to a opening direction of the press plates 140F, 140B when switched to the position c. Also, in order to control drive of the opening-closing cylinder 180 highly accurately, it is desirable to apply PWM control based on duty ratio (so called duty control) or the like to the electromagnetic switching valve 185.

In this way, the press cylinders 150L, 150R are configured as two fixed ones having fixed pressing positions to the pressing surfaces 141 of the press places 140F, 140B, and thus configuration of the hot-press 100 can be simplified. Also, drive of the respective press cylinders 150L, 150R is not controlled individually (controlled jointly), and thus the hydraulic pressure circuit can be simplified.

As shown in a block chart of FIG. 7, a control board 20, which is a cylinder controller of the press control system, mainly comprises a CPU 21, which is a arithmetic unit, a ROM 23, which is a read-only memory device, a RAM 22, which is a RAN main memory device used as working area, and an input-output interface (I/F) 24. These devices are connected with a bus 25 to be transmittable and receivable mutually. The ROM 23 stores preliminarily a pressing process program 23*a*, which conducts press control, and selecting tables 23*b*, 23*c*, which initialize setting of size and material of the boards-to-be-processed W1, or the like.

As shown in FIG. 7, the following signals from respective devices of the hotpress 100 are entered to the control board 20 through the input-output interface 24.

Size selecting switch 10: switching signals when manually inputting selections by pressing a button or the like or inputting data for size of the boards-to-be-processed W1;

Material selecting switch 11: switching signals when manually inputting selections by pressing a button or the like or inputting data for material (hard board, soft board) of the boards-to-be-processed W1;

Opening-closing cylinder linear encoder 181: detection signals of displacement of the ram 183 of the opening-closing cylinder 180; and Pressure sensors for press cylinders 151L, 151R: detection signals of cylinder inner pressures of the press cylinders 150L, 150R.

Similarly, the following signals are output from the control board 20 to respective devices of the hotpress 100 through the input-output interface 24.

Opening-closing cylinder 180: Control output signals for opening and closing by moving the press plates 140*f*, 140*b* (the pressing surfaces 141) closer to and away from each other.

Figure 8:
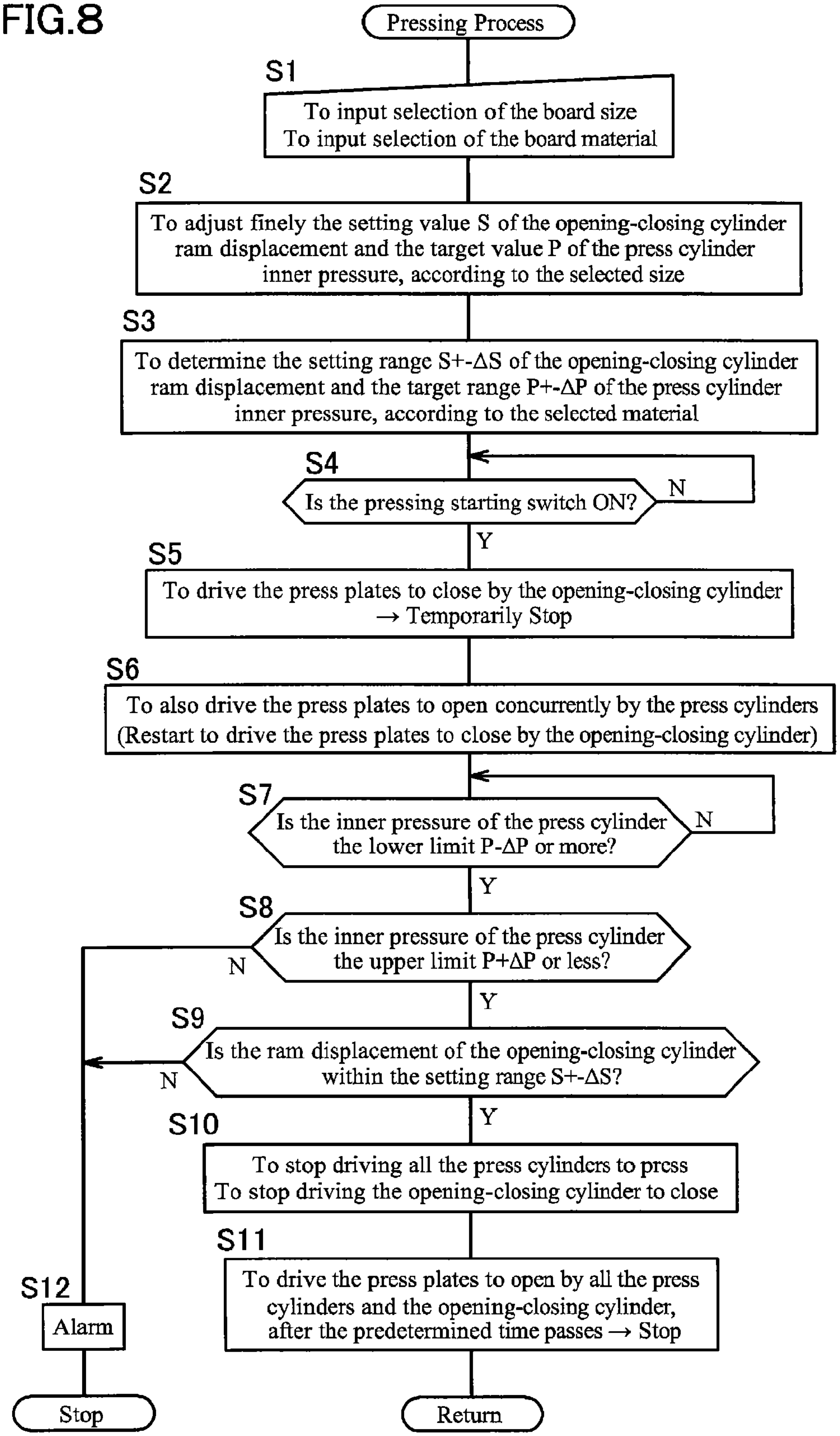
FIG. 8 is a flow chart showing the pressing process.

Press cylinders 150L, 150R: Control output signals for pressing the press plates 140F, 140B (the pressing surfaces 141) concurrently and hot-pressing the object-to-be-processed W (the boards-to-be-processed W1);

Next, by using the flow chart on FIG. 8, referred to the displays 106, 107L, 170R on FIG. 5, the press control of the hotpress 100 will be explained. FIG. 8 responds to the pressing process program 23*a* of FIG. 7.

On the pressing process shown in FIG. 8, when the press cylinders 150L, 150R press the object-to-be-pressed W, drive of the respective press cylinders 150L, 150R are controlled jointly (mutually), so as to have the ram displacement detected by the linear encoder 181 of the predetermined setting range S+−ΔS, under condition that cylinder inner pressures detected by the pressure sensors 151L, 151R are respectively within the predetermined target range P+−ΔP.

Specifically, firstly on S1, size (6-shaku board, 8-shaku board, 10-shaku board or the like) and material (hard board, soft board, or the like) of the boards-to-be-processed W1 is input manually with the size selecting switch 10 and the material selecting switch 11. According the inputs, fine adjustment is conducted, referring to the selecting tables 23*b*, 23*c* of the ROM 23 (FIG. 7). Specifically, On S2, according to the size of the boards-to-be-processed W1, a setting value S of the ram displacement and a target value P of the cylinder inner pressure are adjusted finely. Here, the target value P of the cylinder inner pressure is set mutually for all the press cylinders 150L, 150R (e.g. 7.0 MPa). Next, on S3, the setting range S+−ΔS of the ram displacement (e.g. 1770+−15 mm) and the target range P+−ΔP of the cylinder inner pressure (e.g. 7.0+−0.3 MPa) are determined, based on the setting value S of the ram displacement and the target value P of the cylinder inner pressure finely adjusted on S2. Also, for allowable difference ΔP of the cylinder inner pressure, it is desirable to select (set) a bigger value in a case of hard boards than in a case of soft boards.

When a press starting switch (not shown) is turned to ON (YES on S4), the electromagnetic switching valve 185 is turned to the position b on S5, the opening-closing cylinder 180 is driven to close the press plates 140F, 140B, and then the drive is temporarily stopped by detection of the linear encoder 181. After that, on S6, the press cylinders 150L, 150R are concurrently driven to press the press plates 140F, 140B (the opening-closing cylinder 180 concurrently restarts drive to close the press plates 140F, 140B, however hardly any driven pressure occurs).

When the cylinder inner pressures of all the press cylinders 150L, 150R reach to the lower limit P−ΔP (6.7 MPa here) of the target range P+−ΔP or more (Yes on S7), it is determined if the cylinder inner pressures are the upper limit P+ΔP (7.3 MPa here) of the target range P+−ΔP or less on S8. As shown in FIG. 5, if the cylinder inner pressures of all the press cylinders 150L, 150R are the upper limit P+ΔP or less (Yes on S8), and next it is determined if the ram displacement of the opening-closing cylinder 180 is within the setting range S+−ΔS (1770+−15 mm here) or not by the linear encoder 181 on S9. A shown in FIG. 5, if the ram displacement of the opening-closing cylinder 180 is within the setting range S+−ΔS (Yes on S9), all the press cylinders 150L, 150R are driven to stop pressing, and concurrently the opening-closing cylinder 180 is driven to stop closing on S10. At that time, the decreased amount D1−D2 of the entire thickness of the object-to-be-processed W detected as the displacement (operation distance) of the ram 183 (referred to FIGS. 3 and 4) is within the setting range S+−ΔS (S−ΔS<=D1−D2<=S+ΔS). Further on S11, the electromagnetic switching valves 155, 185 are turned to the position c after a predetermined time passed (e.g. after 10 seconds), the press plates 140F, 140B are driven to open by all the press cylinders 150L, 150R and the opening-closing cylinder 180, and then the drive is stopped by detection of the linear encoder 181, so as to complete the pressing process.

Also, when any inner pressure of the press cylinder 150L, 150R exceeds the upper limit P+ΔP (NO on S8), and also when the ram displacement of the opening-closing cylinder 180 is out of the setting range S+−ΔS (No on S9), alarm for this matter is set off so as to terminate the process on S12, because of large possibility of irregular products.

As described above, the yield ratio of the processed boards W2 can be improved easily by measuring the entire thickness size of the object-to-be-processed W while hot-pressing based on the ram displacement of the opening-closing cylinder 180. Moreover, even when size or material of the processed boards-to-be-processed W1 changes, by controlling drive of the press cylinders 150L, 150R jointly, the thickness of the processed board W2 can be maintained within the allowable size range. Accordingly the press cylinders 150L, 150R, having a rigid and heavy structure, do not have to be provided with a pressing position control-to-shift feature for aligning the pressing position, and thus the structure can be simplified, and the manufacturing cost required for assembling and installation and the running cost required for operation and repair can be reduced.

Operations of the respective press cylinders 150L, 150R can be controlled immediately based on the detected value of the ram displacement obtained from the opening-closing cylinder 180 and the detected values of the cylinder inner pressures obtained from the respective press cylinders 150L, 150R, so as to achieve simplification and acceleration of the system. Further, Not individual thicknesses of the processed boards W2 but the decreased amount D1−D2 of the entire thickness of the object-to-be-processed W (the boards-to-be-processed W1+the hot plates 130) is detected as the ram displacements, and then time consumed for the detection can be reduced. Accordingly, it can be prevented that uneven thickness of the processed boards W2 is caused by inclination of the press plates 140F, 140 B or irregular thickness is caused by delay of stopping the press cylinders 150L, 150R due to delay of the control.

Moreover, the opening-closing cylinder 180 exclusively for opening and closing the press plates 140F, 140B is provided other than the press cylinders 150L, 150R, and then the opening-closing cylinder 180, which requires high speed shifting in a long span, and the press cylinders 150L, 150R, which requires fine shifting in a short span, can be used selectively. Therefore, acceleration of opening-closing movement of the press plates 140F, 140B improves operation efficiency of the hotpress, and also the drive control of the press cylinders 150L, 150R can be conducted highly accurately without influence of opening-closing movement of the press plates 140F, 140B.

Also, the structure can be simplified further by omitting the pressure sensors for press cylinders 151L, 151R and showing the ram displacement (or the entire thickness size of the object-to-be-processed W) detected with the opening-closing cylinder linear encoder 181 on the ram displacement display 106 or storing it on the RAM 23. Also, a pressure sensor for press cylinder can be provided only at one of the press cylinders 150L, 150R, and drive of the press cylinders 150L, 150R may be controlled jointly. Alternatively, drive of the press cylinder 150L, 150R can be controlled individually, based on the detected values of the cylinder inner pressures by the pressure sensors for press cylinders 151L, 151R and the detected value of the ram displacement by the opening-closing cylinder linear encoder 181. In this case, on the flow chart of FIG. 8, the target value P of the cylinder inner pressure on S2 can be set individually for the respective press cylinders 150L, 150R.

Embodiment 2

Figure 9:
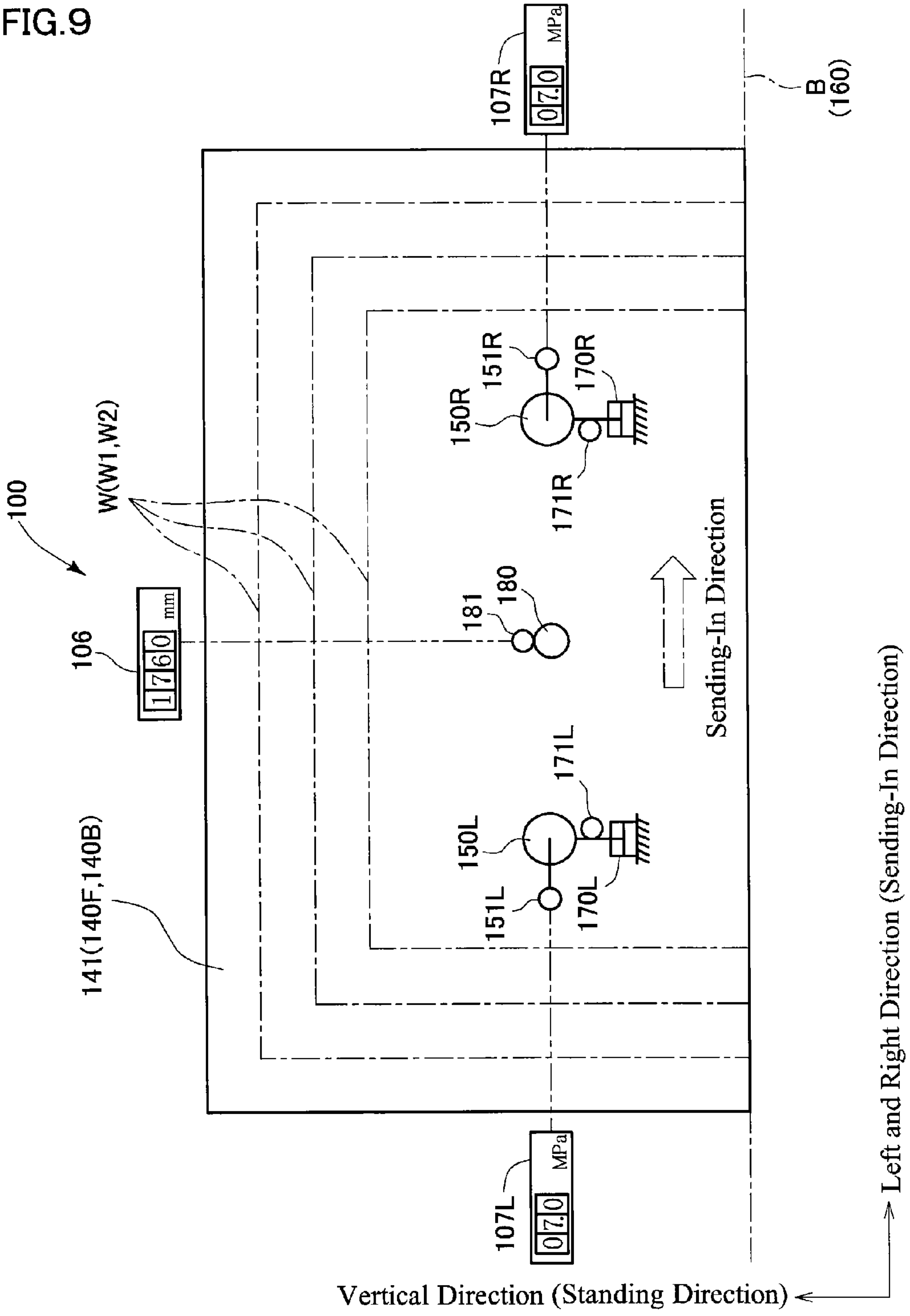
FIG. 9 is an elevation view showing another example of an alignment relation of the press control system.
Figure 10:
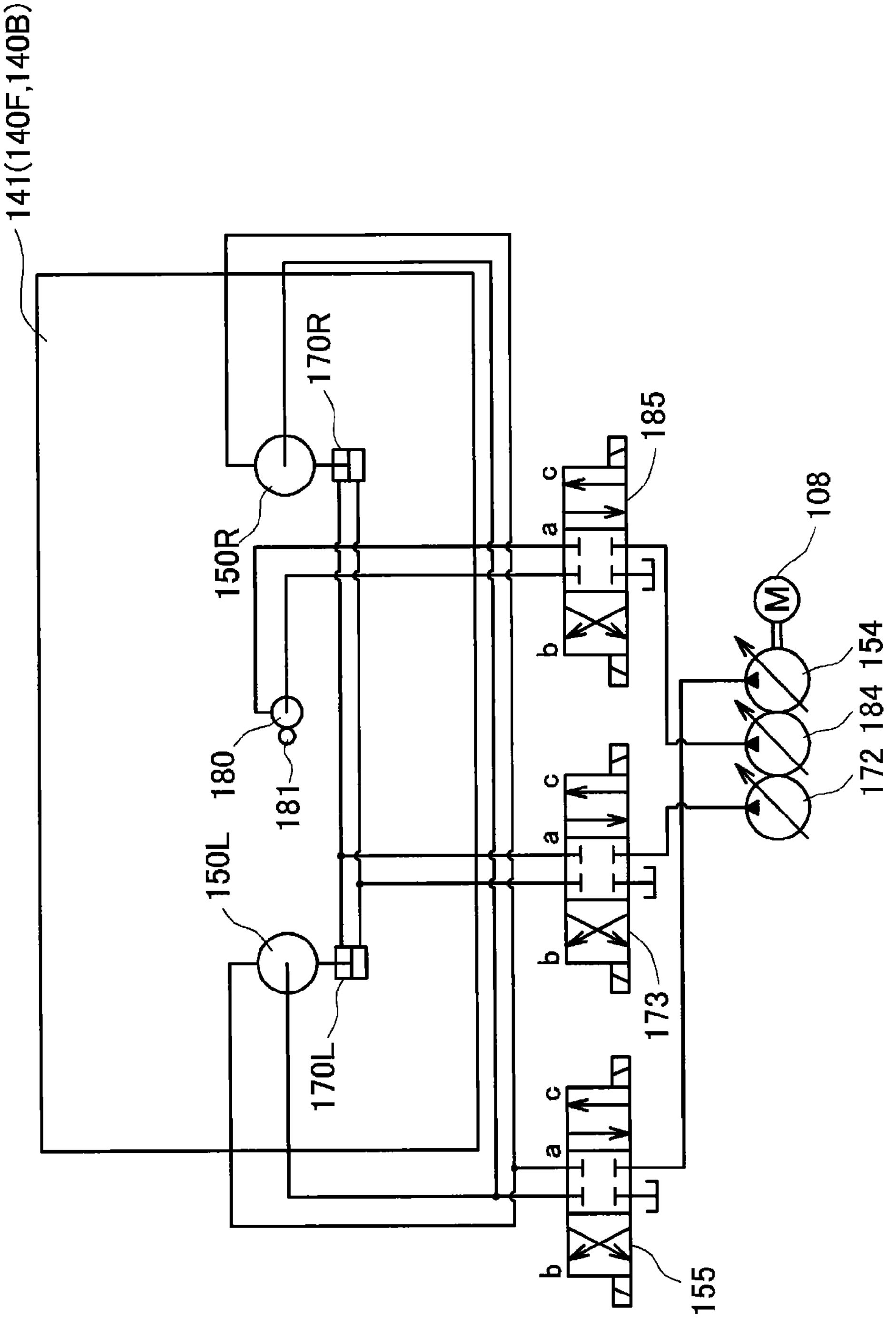
FIG. 10 is a schematic circuit diagram of the hydraulic pressure of FIG. 9.
Figure 11:
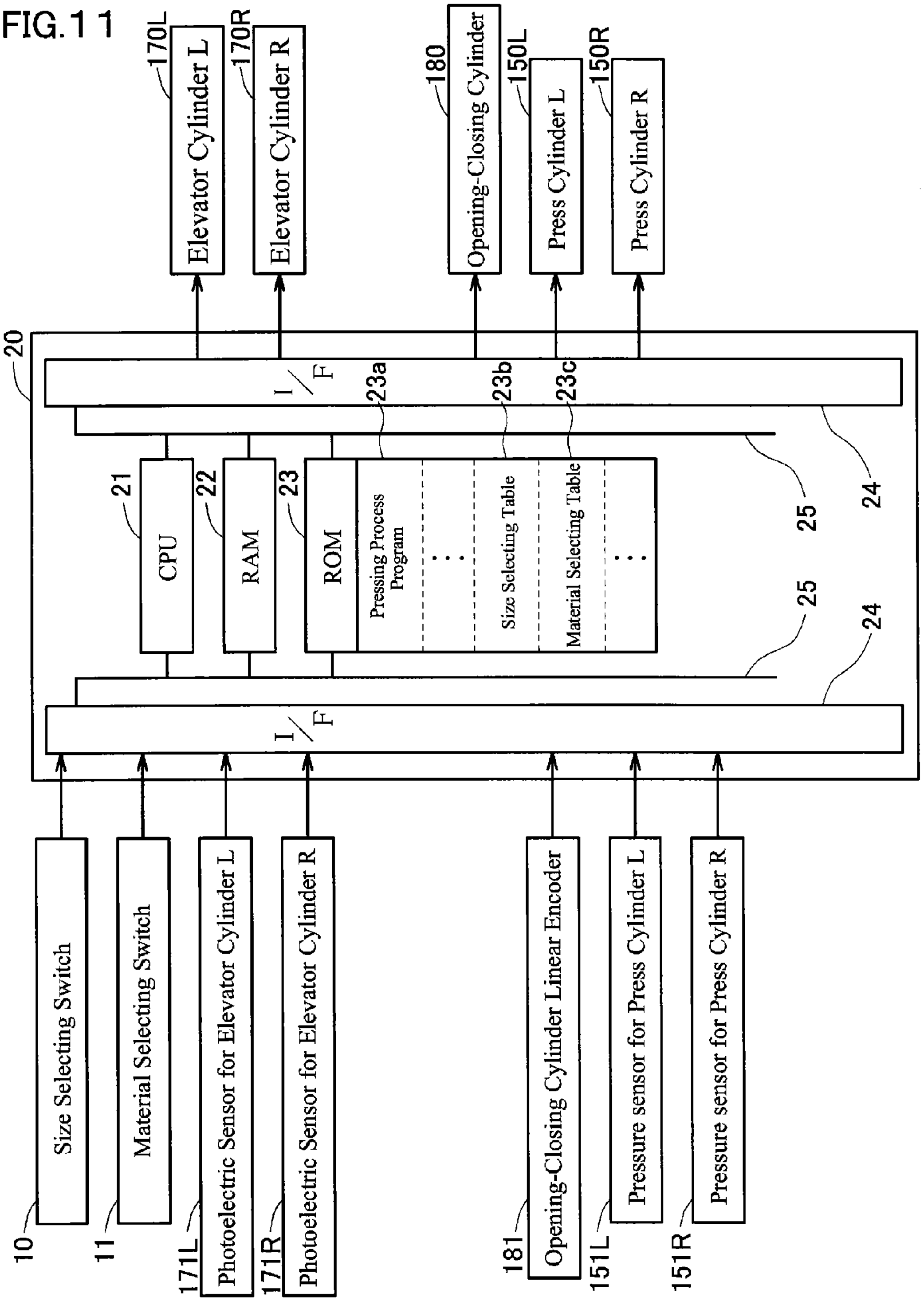
FIG. 11 is a block chart showing an electrical configuration of FIG. 9.

FIG. 9 is an elevation view showing another example of an alignment relation of the press control system, FIG. 10 is a schematic circuit diagram of the hydraulic pressure thereof, and FIG. 11 is a block chart showing an electrical configuration thereof. Regarding the hotpress 100 (hot-pressing member; press structure) shown on the alignment view of FIG. 9, two press cylinders are comprised, and these press cylinders 150L, 150R (hydraulic cylinders; fluid pressure cylinders) are constructed as mobile press cylinders having pressing positions shiftable vertically to the pressing surfaces 141 of the press plates 140F, 140B.

Then, elevator cylinders 170L, 170R (hydraulic cylinders; fluid pressure cylinders) are provided as pressing position control-to-shift features of the press cylinders 150L, 150R. Also, the elevator cylinders 170L, 170R comprise photoelectric sensors for elevator cylinders 171L, 171R (shift detecting means), which detect positions of the press cylinders 150L, 150R shifting up or down.

As shown on the schematic circuit diagram of the hydraulic pressure of FIG. 10, an electromagnetic switching valve 173, which is a 4-port and 3-position switching type, is disposed between a elevator cylinder hydraulic pressure pump 172, which is a variable capacity type driven by an electrical motor 108, and the respective elevator cylinders 170L, 170R. The electromagnetic switching valve 173 connects the hydraulic pressure pump 172 and the respective elevator cylinders 170L, 170R to an elevating direction of the press cylinders 150L, 150R when switched from the neutral position a to the position b, and also connects to a decreasing direction when switched to the position c.

As shown on the block chart of FIG. 11, according to input of the size selecting switch 10, a control output signal for shifting up and down the press cylinders 150L, 150R is input from the control board 20 (cylinder controller) through the input-output interface 24 to the respective elevator cylinders 170L, 170R. Whereas, according to up or down movement of the press cylinders 150L, 150R by the elevator cylinders 170L, 170R, position detection signals of the photoelectric sensors 171L, 171R are input to the control board 20 through the input-output interface 24.

Figure 12:
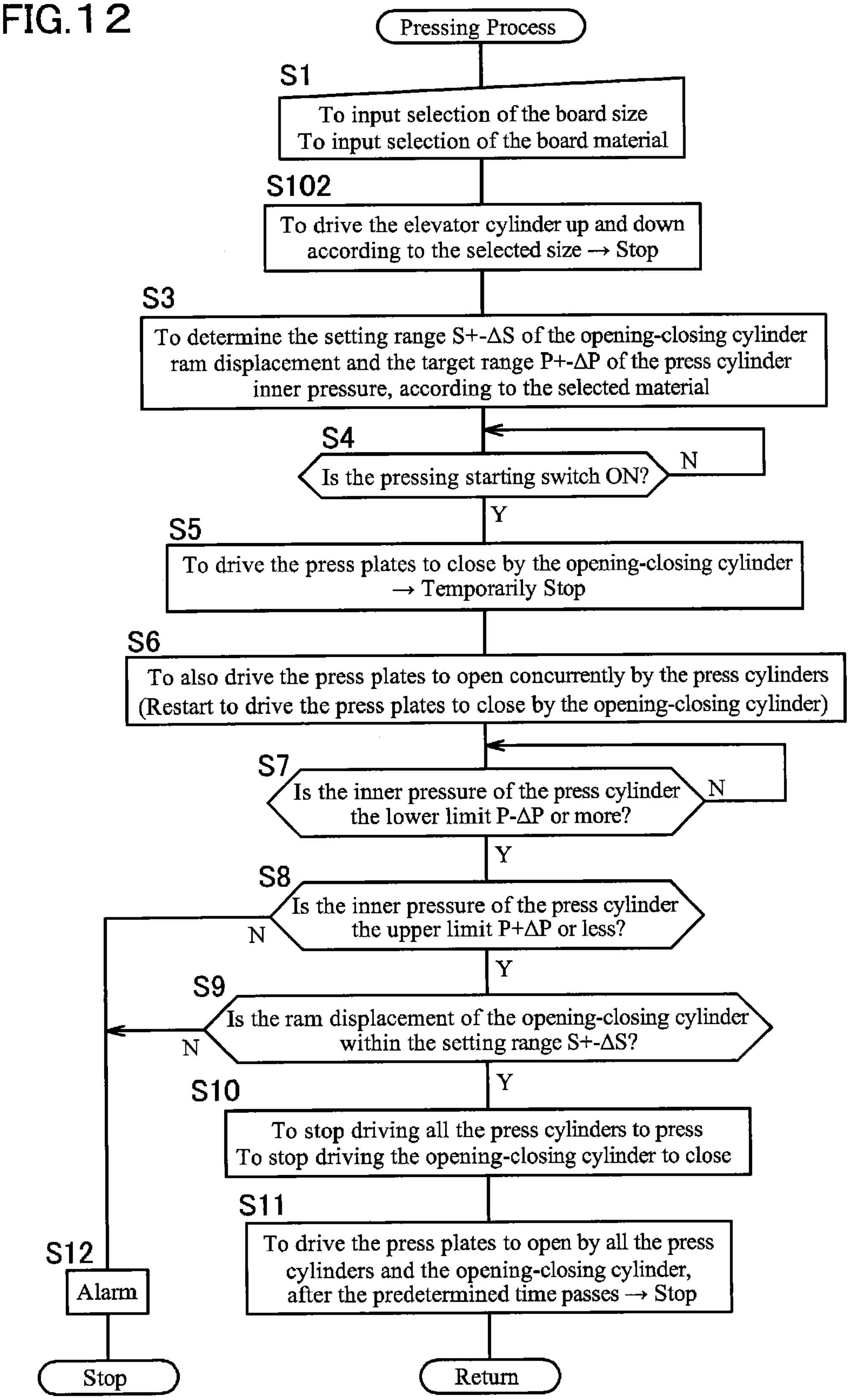
FIG. 12 is a flow chart showing the pressing process.

Accordingly, the flow chart of the pressing process explained for the embodiment 1 (FIG. 8) is modified for this embodiment as shown on FIG. 12.

Regarding the pressing process shown in FIG. 12, firstly on S1, size (6-shaku board, 8-shaku board, 10-shaku board or the like) and material (hard board, soft board, or the like) of the boards-to-be-processed W1 are input manually with the size selecting switch 10 and the material selecting switch 11. Based on the inputs, on S102, according to the size of the boards-to-be-processed W1, the elevator cylinders 170L, 170 R are driven to shift up or down by turning the electromagnetic switching valve 173 to the position b or c, and stopped the elevation drive by detection of the photoelectric sensors 171L, 171R. Next, the setting range S+−ΔS of the ram displacement (e.g. 1770+−15 mm) and the target range P+−ΔP of the cylinder inner pressure (e.g. 7.0+−0.3 MPa) are determined on S3. The control matters on S4 or later would be the same as the embodiment 1 (FIG. 8).

In this way, the press cylinders 150L, 150R are constructed as two mobile styled (elevating styled) ones being able to shift pressing positions up and down to the pressing surfaces 141 of the press plates 140F,140B, and thus even when the relative positional relation with the boards-to-be-processed W1 (the long side opposed to the conveying reference plane B) changes due to size change of the boards-to-be-processed W1, the pressing positions of the mobile press cylinders 150L, 150R can be shifted. Accordingly, when the size of the boards-to-be-processed W1 changes, adjusted ranges (allowable difference ΔP of the target value P) of the cylinder inner pressures of the press cylinder 150L, 150R and an adjusted range (allowable difference ΔS of the setting value S) of the ram displacement of the opening-closing cylinder 180 can be kept small.

Embodiment 3

Figure 13:
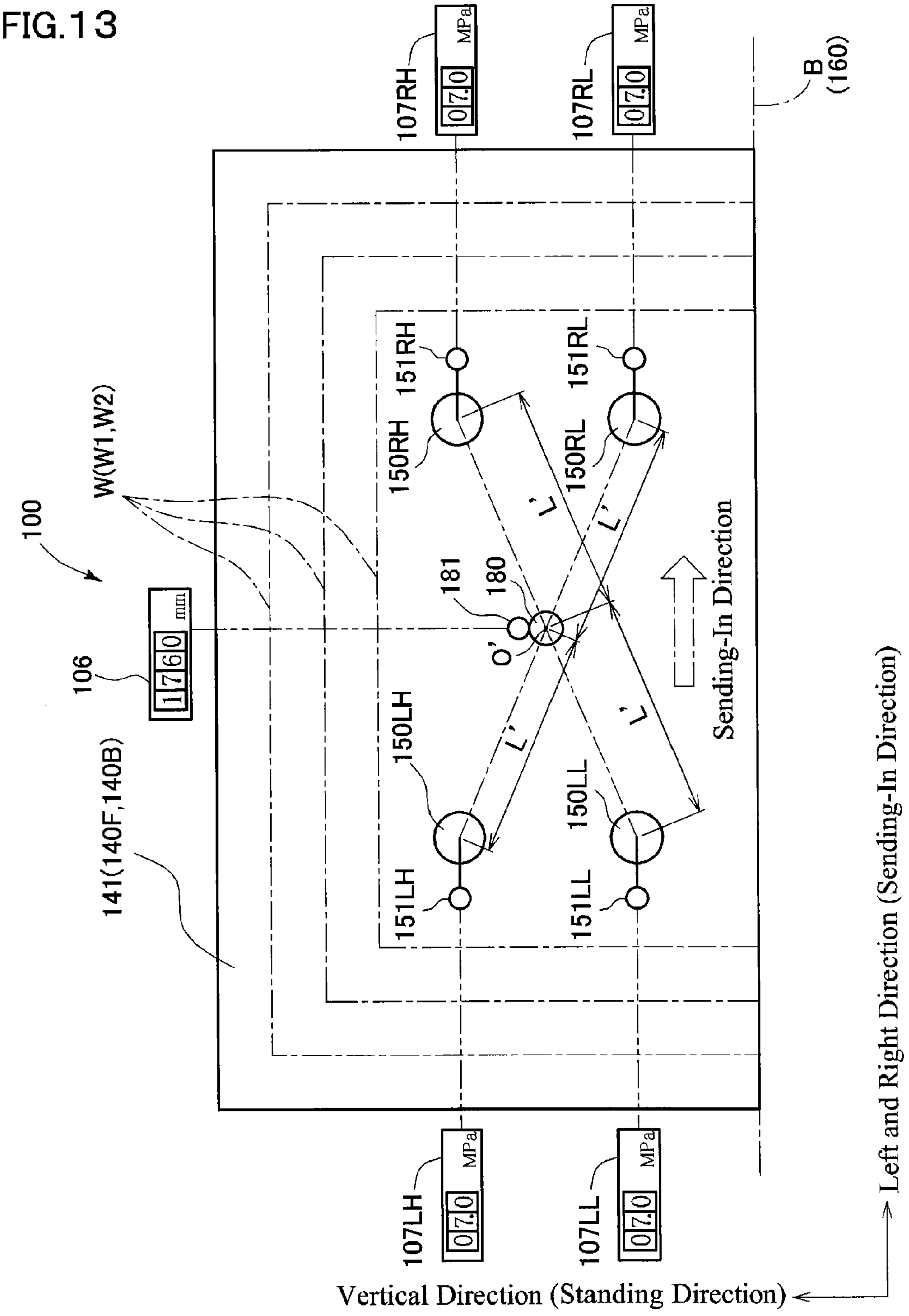
FIG. 13 is an elevation view showing yet another example of an alignment relation of the press control system.
Figure 14:
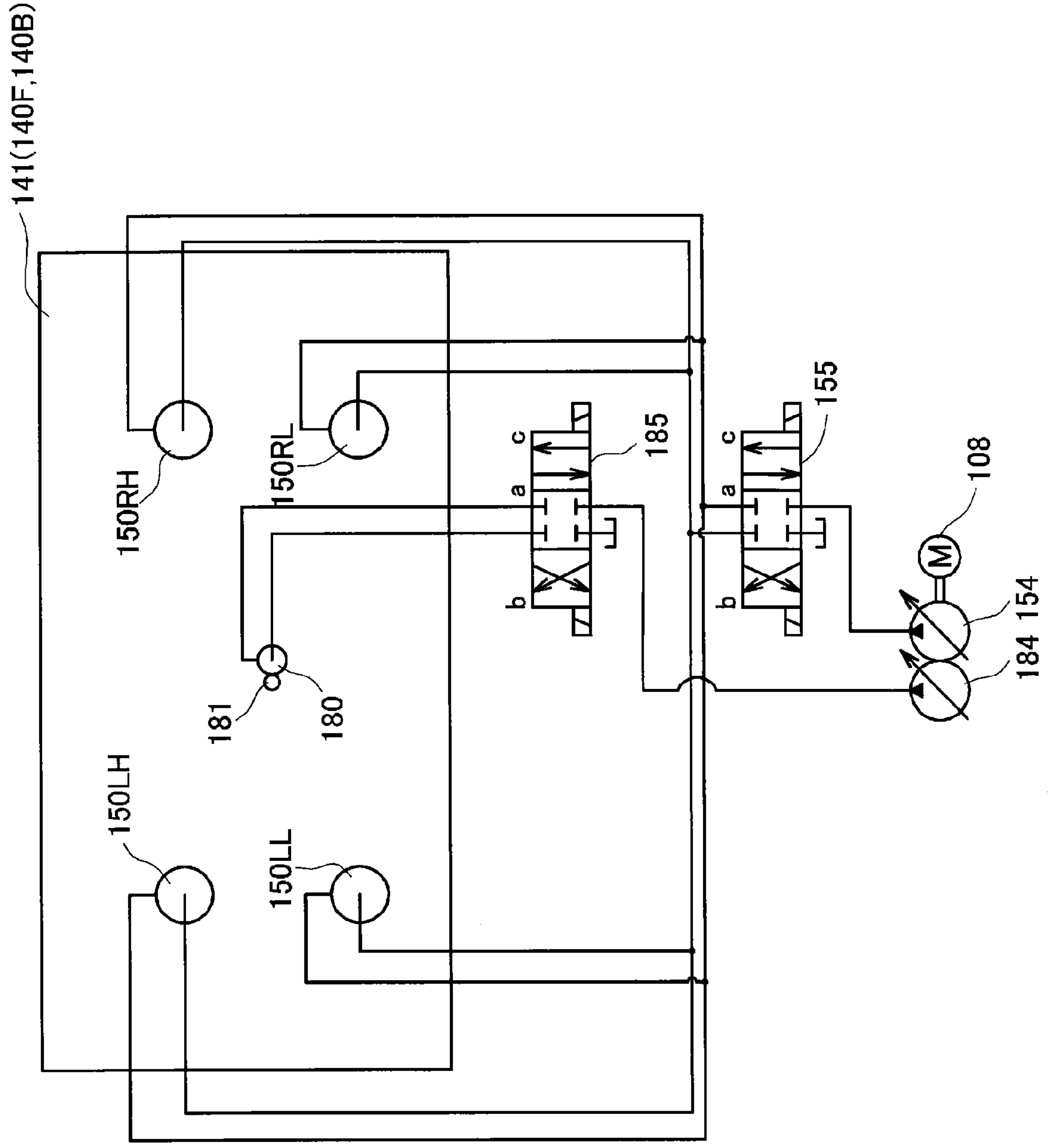
FIG. 14 is a schematic circuit diagram of the hydraulic pressure of FIG. 13.
Figure 15:
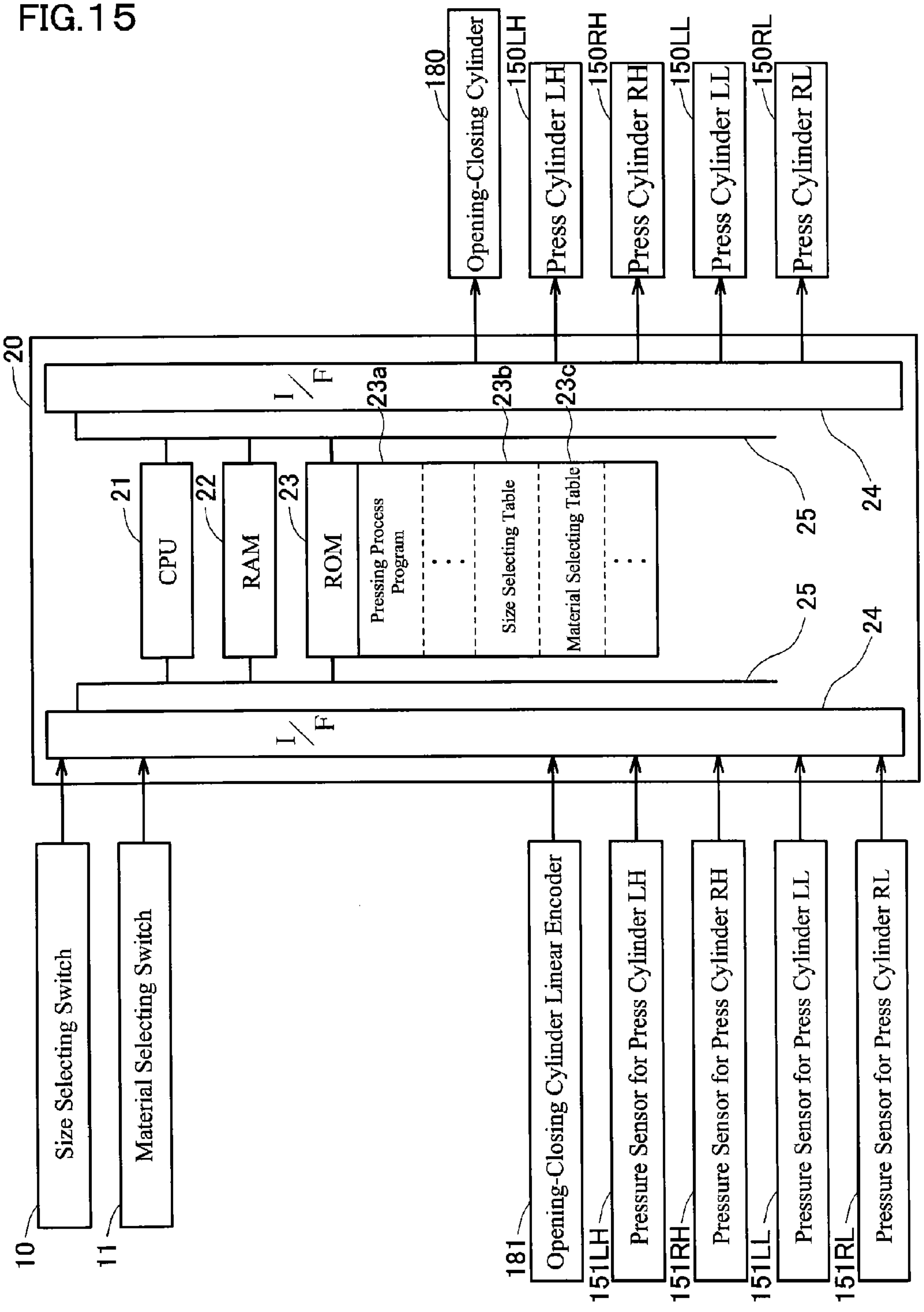
FIG. 15 is a block chart showing an electrical configuration of FIG. 13.

FIG. 13 is an elevation view showing yet another example of an alignment relation of the press control system, FIG. 14 is a schematic circuit diagram of the hydraulic pressure thereof, and FIG. 15 is a block chart showing an electrical configuration thereof.

Regarding the hotpress 100 (hot-pressing member; press structure) shown on the alignment view of FIG. 13, four press cylinders 150LH, 150RH, 150LL, 150RL (hydraulic cylinders; fluid pressure cylinders) are disposed to surround the opening-closing cylinder 180 (radially) to the pressing surfaces 141 of the press plates 140F, 140B. Specifically, the press cylinders 150LH, 150RH, 150LL, 150RL are disposed point-symmetrically and/or line-symmetrically to each other to the opening-closing cylinder 180, and thus the driven pressures (that are cylinder inner pressures) applied to the press cylinders 150LH, 150RH, 150LL, 150RL act concurrently and equally on the press plates 140F, 140B.

More specifically, the opening-closing cylinder 180 is disposed at an intersection O' of a pair of straight lines which intersect on the pressing surface 141, and the respective press cylinders 150RH, 150LH, 150LL, 150RL are disposed, having the intersection O' therebetween, on the respective straight lines so that all the intervals L' to the intersection O' are equal. Alternatively, it could be described that, supposed a pair of straight lines which intersect at a fixed point O' by connecting two points having an equal distance L' from the fixed point O' set on the pressing surface 141 and each point which is point-symmetrical to the fixed point O', the opening-closing cylinder 180 is disposed at an intersection of a pair of two lines, which is the fixed point O' on the pressing surface 141, and the respective press cylinders 150RH, 150LH, 150LL, 150RL are disposed at respective points which are point-symmetrical to the two points and the fixed point O'.

Also, the four press cylinders 150LH, 150RH, 150LL, 150RL are disposed dispersively so as to have the pressing positions to the pressing surfaces 141 of the press plates 140F, 140B to be aligned on two top and bottom lines along the conveying reference plane B (the roller conveyer 160). That means, the upper-left press cylinder 150 LH and the upper-right press cylinder 150 RH disposed in an upper area farther from the conveying reference plane B than the opening-closing cylinder 180 are on the upper line, and the lower-left press cylinder 150 LL and the lower-right press cylinder 150 RL disposed in a lower area closer to the conveying reference plane B are on the lower line. In this way, inclination of the boards-to-be-processed W1 less likely occurs during hot-pressing by disposing the press cylinders 150LH, 150RH, 150LL, 150RL evenly to the pressing surfaces 141 of the press plates 140F, 140B.

The respective press cylinders 150LH, 150RH, 150LL, 150RL comprise pressure sensors for press cylinders 151LH, 151RH, 151LL, 151RL (pressure detecting means) detecting pressing pressure of the press plates 140F, 140B as cylinder inner pressures (driven pressures). Also, ram displacement displays 106 and cylinder inner pressure displays 107LH, 107RH, 107LL, 107RL are provided to display detected values of the opening-closing cylinder linear encoder 181 (displacement detecting means; distance detecting means) and the pressure sensors 151LH, 151RH, 151LL, 151RL through a transmitter (sending device) or the like.

As shown on a schematic circuit diagram of the hydraulic pressure of FIG. 14, an electromagnetic switching valve 155 which is a 4-port and 3-position switching type, is disposed between a press cylinder hydraulic pressure pump 154, which is a variable capacity type driven by an electrical motor 108, and the respective press cylinders 150LH, 150RH, 150LL, 150RL. The electromagnetic switching valve 155 connects the hydraulic pump 154 and the press cylinders 150LH, 150RH, 150LL, 150RL to a closing direction of the press plates 140F, 140B when switched from the neutral position a to the position b, and connects to a opening direction of the press plates 140F, 140B when switched to the position c. Also, in order to control drive of the press cylinders 150LH, 150RH, 150LL, 150RL highly accurately, it is desirable to apply PWM control based on duty ratio (so called duty control) or the like to the electromagnetic switching valve 155.

In this way, the press cylinders 150LH, 150RH, 150LL, 150RL are constructed as four fixed ones which have fixed pressing positions to the pressing surfaces 141 of the press plates 140F, 140B, and thus the structure of the hotpress 100 can be simplified further. Also, the block chart of FIG. 15 is configured based on the modifications of FIGS. 13 and 14, however the differences from the bock chart shown in the embodiment 1 (FIG. 7) have already been explained and obvious, and thus the explanation of FIG. 15 will be omitted.

Regarding this embodiment, the flow chart for the pressing process explained for the embodiment 1 (FIG. 8) can be implemented. In this regard, in a case of controlling drive of the press cylinders 150LH, 150RH, 150LL, 150RL individually, A target value P of the cylinder inner pressures on S2 of the flow chart of FIG. 8 can be set individually for the respective press cylinders 150LH, 150RH, 150LL, 150RL. For example, different target values P can be set for the upper lined press cylinders 150LH, 150RH (e.g. 7.1 MPa) and the lower lined press cylinders 150LL, 150RL (e.g. 6.9 MPa). Next, on S3, the setting range S+−ΔS of the ram displacement (e.g. 1770+−15 mm) and the target range of the cylinder inner pressure P+−ΔP (e.g. 7.1+−0.3 MPa for the upper lined and 6.9+−0.3 MPa for the lower lined) are determined, based on the setting value S of the ram displacement and the target value P of the cylinder inner pressure finely adjusted on S2.

Embodiment 4

Figure 16:
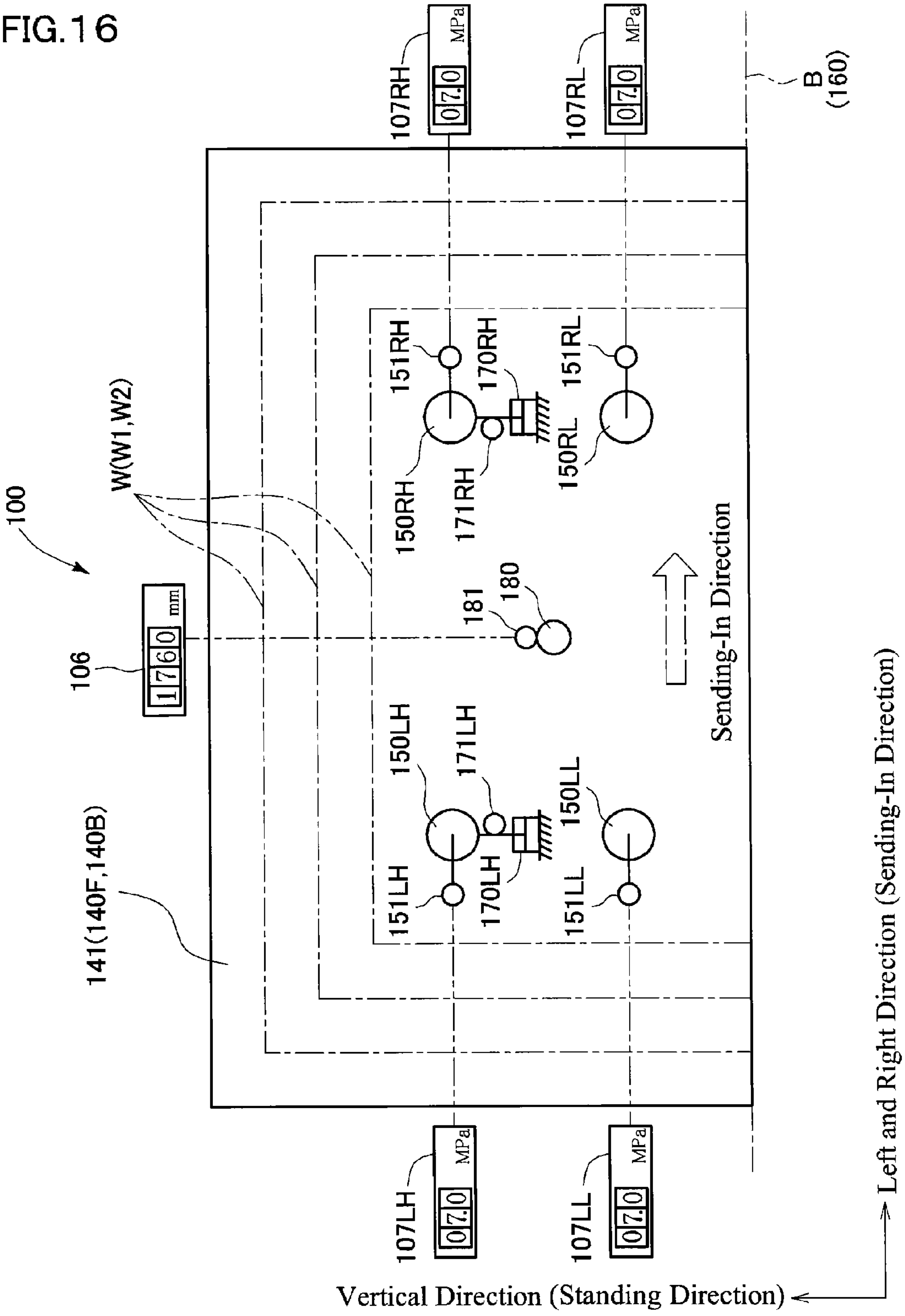
FIG. 16 is an elevation view showing yet another example of an alignment relation of the press control system.
Figure 17:
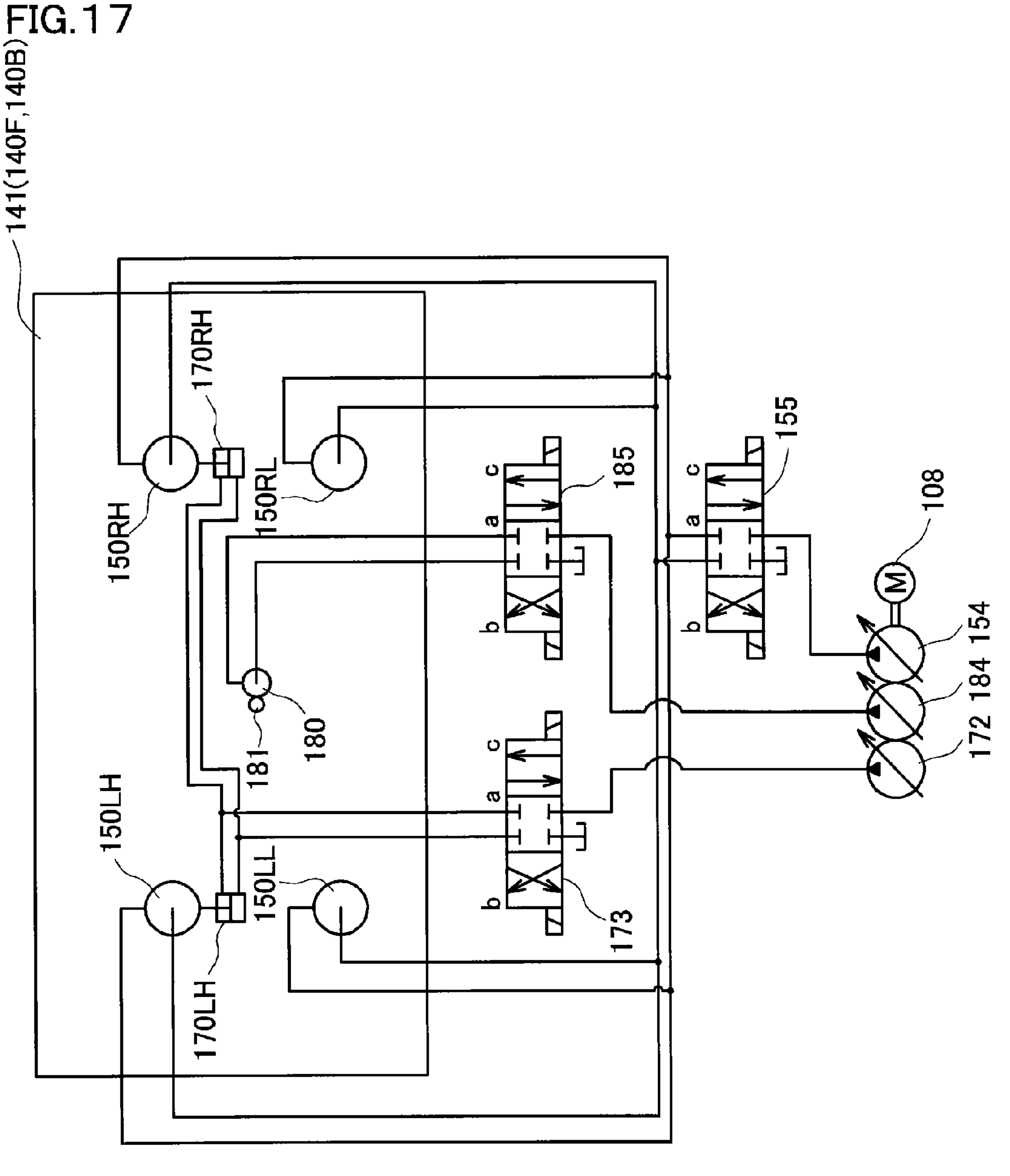
FIG. 17 is a schematic circuit diagram of the hydraulic pressure of FIG. 16.
Figure 18:
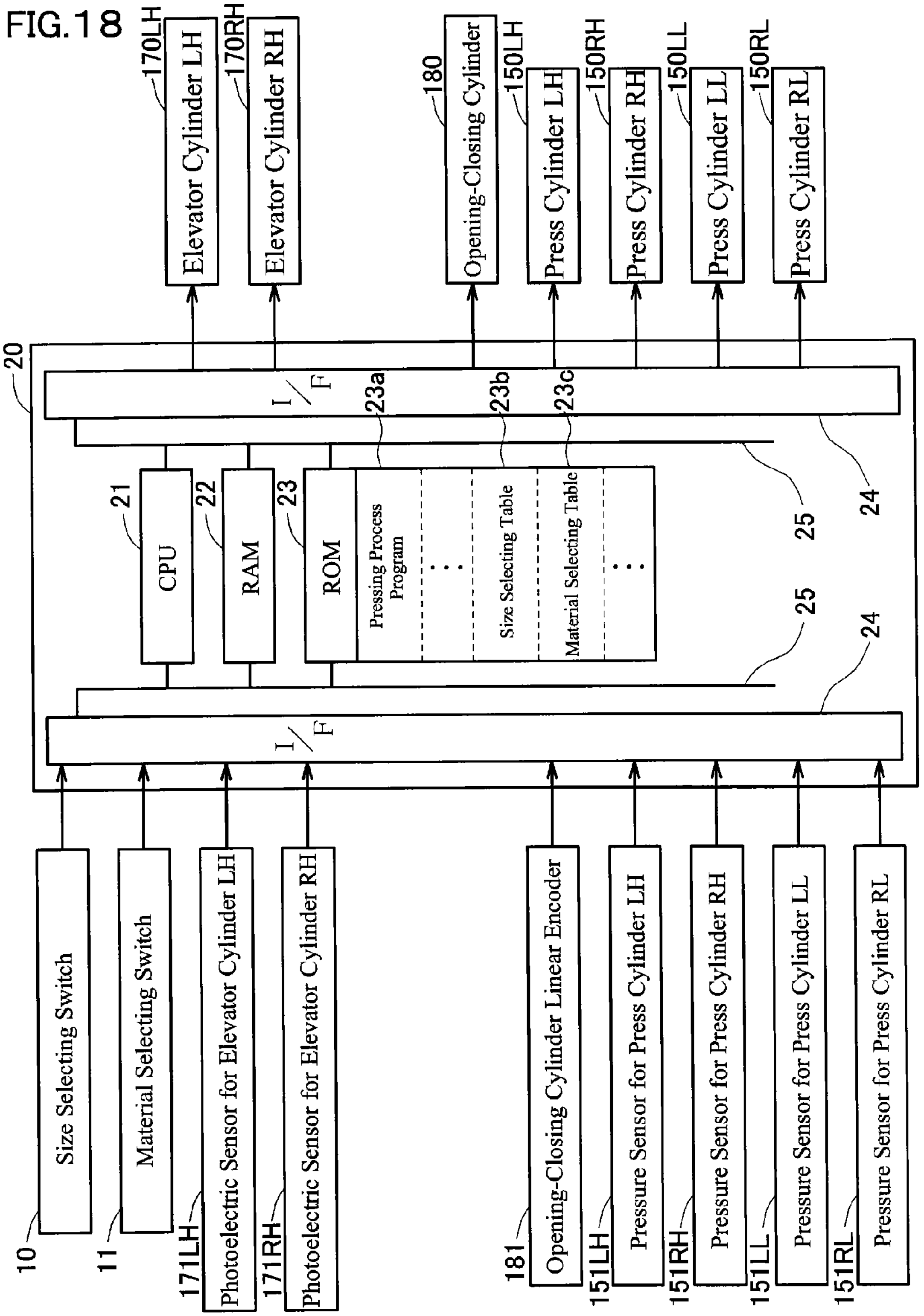
FIG. 18 is a block chart showing an electrical configuration of FIG. 16.

FIG. 16 is an elevation view showing yet another example of an alignment relation of the press control system, FIG. 17 is a schematic circuit diagram of the hydraulic pressure thereof, and FIG. 18 is a block chart showing an electrical configuration thereof. Regarding the hotpress 100 (hot-pressing member; press structure) shown on the alignment view of FIG. 16, the lower-lined press cylinders 150LL, 150RL (hydraulic cylinders; fluid pressure cylinders) are constructed as fixed press cylinders having fixed pressing positions to the pressing surfaces 141 of the press plates 140F, 140B. Whereas, the upper-lined press cylinders 150LH, 150RH (hydraulic cylinders; fluid pressure cylinders) are constructed as mobile press cylinders having pressing positions shiftable vertically to the pressing surfaces 141 of the press plates 140F, 140B. Then, elevator cylinders 170LH, 170RH (hydraulic cylinders; fluid pressure cylinders) are provided as pressing position control-to-shift features of the upper press cylinders 150LH, 150RH. Also, the elevator cylinders 170LH, 170RH comprise photoelectric sensors for elevator cylinders 171LH, 171 RH (shift detecting means), which detect positions of the press cylinders 150LH, 150RH shifting up or down.

As shown on the schematic circuit diagram of the hydraulic pressure of FIG. 17, an electromagnetic switching valve 173, which is a 4-port and 3-position switching type, is disposed between a elevator cylinder hydraulic pressure pump 172, which is a variable capacity type driven by an electrical motor 108, and the elevator cylinders 170LH, 170RH. The electromagnetic switching valve 173 connects the hydraulic pressure pump 172 and the respective elevator cylinders 170LH, 170RH to an elevating direction of the press cylinders 150LH, 150RH when switched from the neutral position a to the position b, and also connects to a decreasing direction when switched to the position c.

As shown on the block chart of FIG. 18, according to input of the size selecting switch 10, a control output signal for shifting up and down the press cylinders 150LH, 150RH is input from the control board 20 (cylinder controller) through the input-output interface 24 to the respective elevator cylinders 170LH, 170RH. Whereas, according to up or down movement of the press cylinders 150LH, 150RH by the elevator cylinders 170LH, 170RH, position detection signals of the photoelectric sensors 171LH, 171 RH are input to the control board 20 through the input-output interface 24.

Regarding this embodiment, the flow chart for the pressing process explained for the embodiment 2 (FIG. 12) can be implemented.

In this embodiment, the upper lined press cylinders 150LH, 150RH are constructed as mobile styled (elevating styled) ones being able to shift pressing positions up and down. Thus even when the height position of the upper side of the boards-to-be-processed W1 changes due to size change of the boards-to-be-processed W1, the pressing positions of the upper lined press cylinders 150LH, 150RH can be adjusted. Accordingly, when the size of the boards-to-be-processed W1 changes, adjusted ranges (allowable difference ΔP of the target value P) of the cylinder inner pressures of the press cylinders 150LH, 150RH and an adjusted range (allowable difference ΔS of the setting value S) of the ram displacement of the opening-closing cylinder 180 can be kept small.

Embodiment 5

Figure 19:
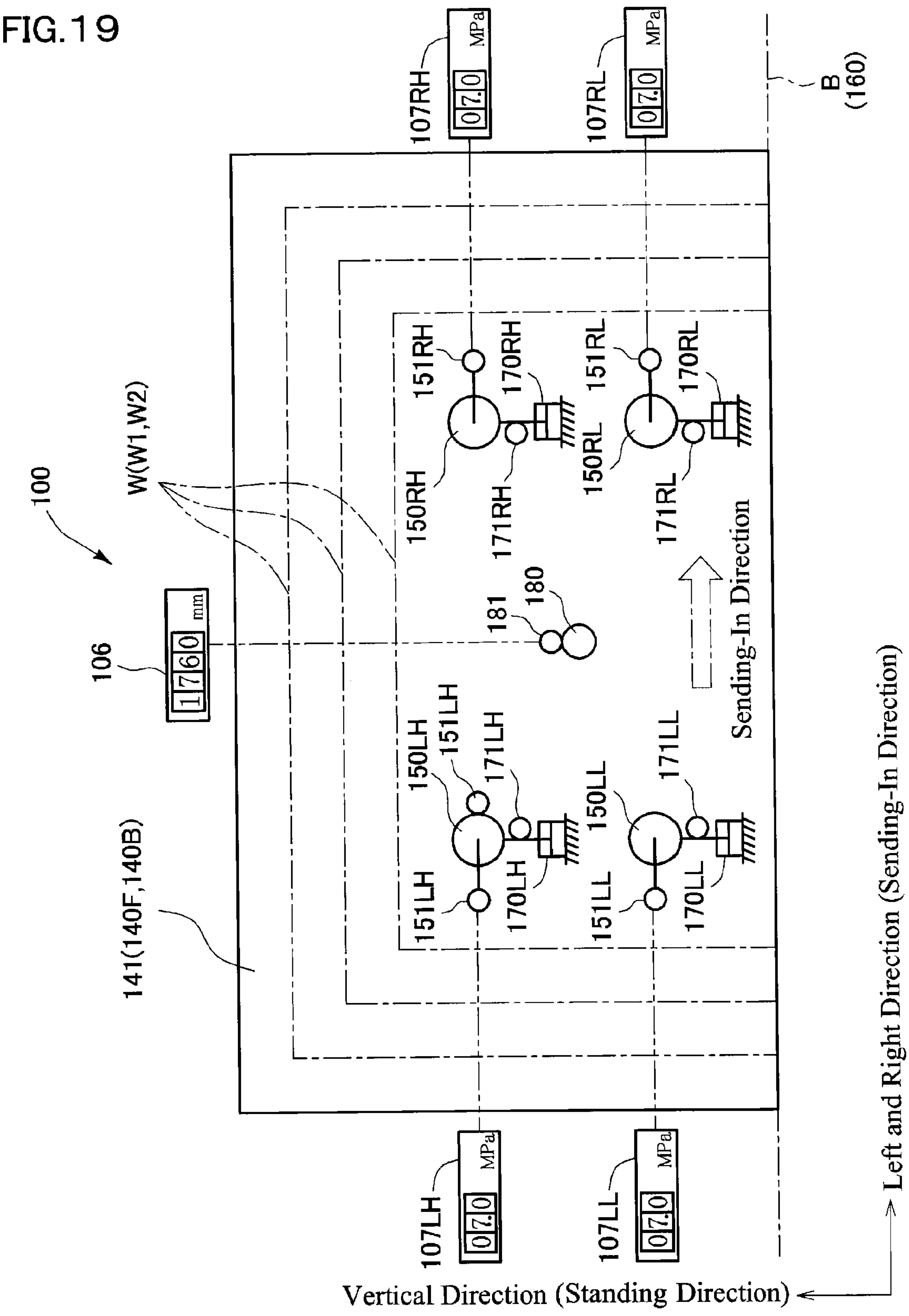
FIG. 19 is an elevation view showing yet another example of an alignment relation of the press control system.
Figure 20:
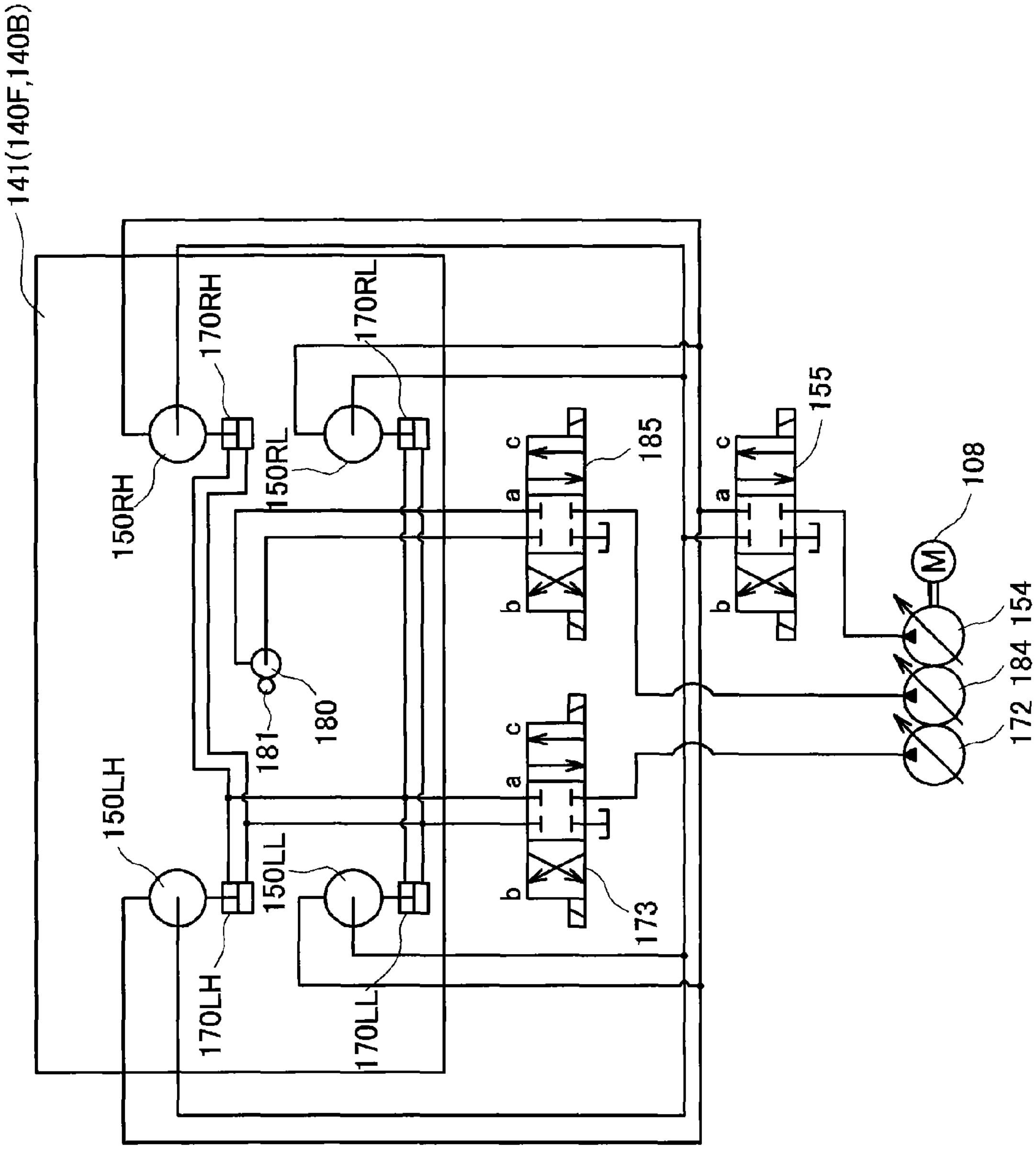
FIG. 20 is a schematic circuit diagram of the hydraulic pressure of FIG. 19.
Figure 21:
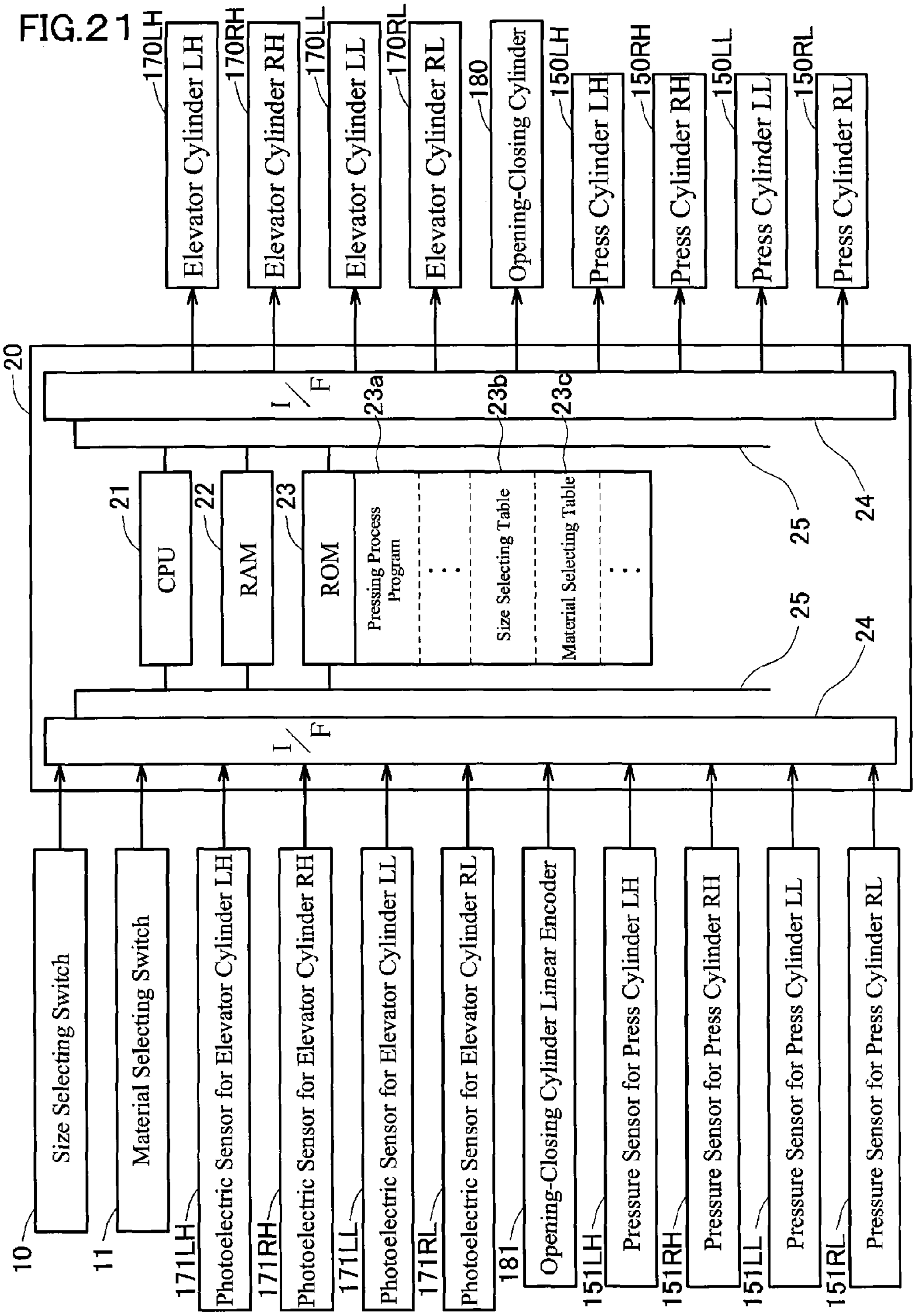
FIG. 21 is a block chart showing an electrical configuration of FIG. 19.

FIG. 19 is an elevation view showing yet another example of an alignment relation of the press control system, FIG. 20 is a schematic circuit diagram of the hydraulic pressure thereof, and FIG. 21 is a block chart showing an electrical configuration thereof. Regarding the hotpress 100 (hot-pressing member; press structure) shown on the alignment view of FIG. 14, additionally to the upper lined press cylinders 150LH, 150RH (hydraulic cylinders; fluid pressure cylinders), the lower-lined press cylinders 150LL, 150RL (hydraulic cylinders; fluid pressure cylinders) are constructed as mobile press cylinders having pressing positions shiftable vertically to the pressing surfaces 141 of the press plates 140F 140B. Accordingly, elevator cylinders 170LL, 170RL (hydraulic cylinders; fluid pressure cylinders) are added as pressing position control-to-shift features of the lower press cylinders 150LL, 150RL. Also, the elevator cylinders 170LL, 170RL comprise photoelectric sensors for elevator cylinders 171LL, 171RL (shift detecting means), which detect positions of the press cylinders 150LL, 150RL shifting up or down.

As shown on the schematic circuit diagram of the hydraulic pressure of FIG. 20, the electromagnetic switching valve 173 is also disposed between a elevator cylinder hydraulic pressure pump 172 and the elevator cylinders 170LL, 170RL. The electromagnetic switching valve 173 connects the hydraulic pressure pump 172 and the respective elevator cylinders 170LH, 170RH, 170LL, 170RL to an elevating direction of the press cylinders 150LH, 150RH, 150LL, 150RL when switched from the neutral position a to the position b, and also connects to a decreasing direction when switched to the position c.

As shown on the block chart of FIG. 21, according to input of the size selecting switch 10, a control output signal for shifting up and down the press cylinders 150LL, 150RL is input from the control board 20 (cylinder controller) through the input-output interface 24 to the respective elevator cylinders 170LL, 170RL. Whereas, according to up or down movement of the press cylinders 150LL, 150RL by the elevator cylinders 170LL, 170RL, position detection signals of the photoelectric sensors 171LL, 171RL are input to the control board 20 through the input-output interface 24.

Regarding this embodiment, the flow chart for the pressing process explained for the embodiment 2 (FIG. 12) can be implemented.

In this embodiment, additionally to the upper lined press cylinders 150LH, 150RH, the lower lined press cylinders 150LL, 150RL are also constructed as two mobile styled (elevating styled) ones being able to shift pressing positions up and down. Thus even when the height position of the upper side of the boards-to-be-processed W1 changes due to size change of the boards-to-be-processed W1, the pressing positions of the upper lined press cylinders 150LH, 150RH as well as the lower lined press cylinders 150LL, 150RL can be adjusted. Accordingly, when the size of the boards-to-be-processed W1 changes, adjusted ranges (allowable difference ΔP of the target value P) of the cylinder inner pressures of the press cylinders 150LH, 150RH 150LL, 150RL and an adjusted range (allowable difference ΔS of the setting value S) of the ram displacement of the opening-closing cylinder 180 can be kept small.

EXPLANATION OF REFERENCES

1 Horizontal hotpress system
10 Size selecting switch
11 Material selecting switch
20 Control board (Cylinder Controller)
100 Hotpress (Hot-pressing member; Press Structure)
103F, 103B Fixed frame
130 Hot Plate
140F, 140B Press Plate
141 Pressing surface
150L, 150R, 150LH, 150RH, 150LL, 150RL Press cylinder (Hydraulic cylinder; Fluid Pressure Cylinder)
151L, 151R, 151LH, 151RH, 151LL, 151RL Pressure sensors for press cylinder (Pressure detecting means)
153L, 153R, 153LH, 153RH, 153LL, 153RL Ram
170L, 170R, 170LH, 170RH, 170LL, 170RL Elevator cylinder (Hydraulic cylinders; Fluid pressure cylinders)
171L, 171R, 171LH, 171RH, 171LL, 171RL Photoelectric sensors for elevator cylinder (Shift detecting means)
180 Opening-closing cylinder (Hydraulic cylinder; Fluid Pressure Cylinder)
181 Opening-closing cylinder linear encoder (displacement detecting means; distance detecting means)
183 Ram
B Conveying reference plane
D1 Size of the entire thickness of the object-to-be-processed before hot-pressing
D2 Size of the entire thickness of the object-to-be-processed after hot-pressing
P Target value of the cylinder inner pressure (driven pressure)
S Setting value of the ram displacement (Operation Distance)
W Object-to-be-processed
W1 Boards-to-be-processed (boards)
W2 Processed boards (laminated boards)

What is claimed is:

1. A horizontal hotpress system manufacturing a plurality of wooden laminated boards all at once, by constructing an object-to-be-processed by sending stacked boards of veneers applied adhesive on bonding surfaces respectively in a standing position between a plurality of hot plates disposed, so as to be superposed in a thickness direction, and hot-pressing the boards by driving at least one of press plates disposed on both outer sides in a superposition direction of the object-to-be-processed, and further comprising;

a opening-closing cylinder disposed at a center region on pressing surfaces of the press plates, and opening and closing by moving the press plates closer and distanced;

a plurality of press cylinders disposed at a plurality of positions different from each other to the pressing surfaces of the press plates around the opening-closing cylinder, and pressing the object-to-be-processed from a superposition direction respectively by driving the press plates; and a distance detecting means for detecting an operation distance of the opening-closing cylinder in the superposition direction while the plurality of the press cylinders press the object-to-be-processed, wherein thickness size at a center region of the entire object-to-be-processed while hot-pressed can be measured, according to the operation distance of the opening-closing cylinder detected by the distance detecting means.

2. The horizontal hotpress system as claimed in claim 1, comprising;

a pressure detecting means for detecting at least one of driven pressures applied to the plurality of the press cylinders respectively; and a cylinder controller for controlling drive of the plurality of the press cylinders in order to have entire thickness of the object-to-be-processed after hot-pressing within a allowable size range, according to a detected value of the operation distance by the distance detecting means and a detected value of the driven pressure by the pressure detecting means.

3. The horizontal hotpress system as claimed in claim 2, wherein the cylinder controller controls drive of the plurality of the press cylinders so as to have the operation distance detected by the distance detecting means within a predetermined setting range, when the plurality of the press cylinders press the object-to-be-pressed, under a condition of having the driven pressures detected by the pressure detecting means within a predetermined target range.

4. The horizontal hotpress system as claimed in any one of claims 1 to 3, wherein the plurality of the press cylinders are disposed so as to have pressing positions to the pressing surfaces of the press plates equally distanced from the opening-closing cylinder respectively.

5. The horizontal hotpress system as claimed in claim 4, wherein the plurality of the press cylinders are constructed as an even number of fixed press cylinders having fixed pressing positions to the pressing surfaces of the press plates, and also the fixed pressing positions can be disposed to be point-symmetrical as well as line-symmetrical to each other to the opening-closing cylinder.

6. The horizontal hotpress system as claimed in any one of claims 1 to 3, wherein the boards are sent in having one long side of a rectangle shape as a conveying reference plane, and a press cylinder, disposed at least closer to the conveying reference plane than the opening-closing cylinder, of the plurality of the press cylinders is constructed as a fixed press cylinder having a fixed pressing position.

7. The horizontal hotpress system as claimed in claim 6, wherein the plurality of the press cylinders include;

a plurality of fixed press cylinders disposed on a region closer to the conveying reference plane than the opening-closing cylinder, and also having fixed pressing positions; and similarly a plurality of mobile press cylinders disposed on a region farther from the conveying reference plane, and also having pressing positions shiftable to the pressing positions of the fixed press cylinders.

* * * * *